(12) United States Patent
Liu et al.

(10) Patent No.: US 11,294,518 B1
(45) Date of Patent: Apr. 5, 2022

(54) TOUCH PANEL AND DEVICE THEREOF

(71) Applicant: TPK Advanced Solutions Inc., Fujian (CN)

(72) Inventors: Qi Bin Liu, Shanghang County (CN); Kuolung Fang, Zhudong Township, Hsinchu County (TW); You Zhi She, Putian (CN); Ya Ting Hsu, Lunbei Township, Yunlin County (TW); Bao Lin Liu, Xiamen (CN); Yong Jin Wu, Jian'ou (CN); Pei Qin Xu, Yongchun County (CN)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/020,952

(22) Filed: Sep. 15, 2020

(51) Int. Cl.
*G06F 3/044* (2006.01)

(52) U.S. Cl.
CPC .......... *G06F 3/0443* (2019.05); *G06F 3/0446* (2019.05); *G06F 2203/04111* (2013.01)

(58) Field of Classification Search
None
See application file for complete search history.

(56) References Cited

U.S. PATENT DOCUMENTS

| | | | | |
|---|---|---|---|---|
| 9,383,842 B2* | 7/2016 | Choi | ....................... | B32B 37/12 |
| 9,904,391 B2 | 2/2018 | Ishizaki et al. | | |
| 2006/0046038 A1* | 3/2006 | Nakanishi | ........... | G06F 3/04164 |
| | | | | 428/212 |
| 2012/0062478 A1* | 3/2012 | Kim | ........................ | G06F 3/045 |
| | | | | 345/173 |
| 2015/0091590 A1* | 4/2015 | Jung | ..................... | G06F 3/0445 |
| | | | | 324/685 |
| 2017/0262096 A1* | 9/2017 | Kim | ..................... | G06F 3/0416 |
| 2019/0012018 A1* | 1/2019 | Baek | ..................... | G06F 3/0443 |
| 2019/0348473 A1 | 11/2019 | Xu | | |

FOREIGN PATENT DOCUMENTS

| | | |
|---|---|---|
| CN | 105870146 A | 8/2016 |
| CN | 107706214 A | 2/2018 |
| TW | 201219902 A | 5/2012 |
| TW | 201318159 A | 5/2013 |
| TW | 201825280 A | 7/2018 |
| TW | 201939166 A | 10/2019 |

\* cited by examiner

*Primary Examiner* — Duane N Taylor, Jr.
(74) *Attorney, Agent, or Firm* — Cooper Legal Group, LLC

(57) ABSTRACT

The present disclosure relates to the field of touch technology, and provides a touch display module including a substrate, a transparent conductive layer, a moisture barrier layer, and a display element. The transparent conductive layer is disposed on the substrate. The moisture barrier layer extends laterally on the transparent conductive layer and covers the transparent conductive layer, and the moisture barrier layer includes inorganic materials. The display element is disposed on the moisture barrier layer. The touch display module of the present disclosure can avoid or slow down the water vapor/humidity intrusion from the environment, thereby meeting the specification requirements for improving product reliability test.

20 Claims, 26 Drawing Sheets

TOUCH PANEL AND DEVICE THEREOF

BACKGROUND

Field of Disclosure

The present disclosure relates to the field of touch technology, and in particular to a touch panel with high water resistance and a device thereof.

Description of Related Art

In recent years, with the continuous development of touch technology, transparent conductors can simultaneously allow light to pass through and provide appropriate conductivity. Therefore, transparent conductors are often used in many display or touch-related devices. Generally speaking, transparent conductors can be various metal oxides, such as indium tin oxide (ITO), indium zinc oxide (IZO), cadmium tin oxide (CTO), or aluminum-doped zinc oxide (AZO). However, films made of these metal oxides cannot meet the flexibility requirements of display devices. Therefore, a variety of flexible transparent conductors have been developed today, such as those made of metal nanowires and other materials.

However, the displays or touch devices made of metal nanowires still have many problems that need to be solved. For example, if producing touch electrodes by using metal nanowires, a polymer film may be used with the metal nanowires. However, the polymer film is often made of organic materials, and the polymer film often extends to a peripheral region of the device, resulting in leakage. Therefore, the water vapor/humidity in the environment easily invades from the polymer film layer, resulting in insufficient reliability of metal nanowires.

SUMMARY

In order to overcome the problem of electromigration of metal nanowires caused by the rapid intrusion of the water vapor, the present disclosure provides a touch display module with a moisture barrier layer and/or an adhesive layer of suitable material. The moisture barrier layer and/or the adhesive layer of suitable material can reduce water vapor intrusion to avoid electromigration of metal nanowires or slow down the time of electromigration of metal nanowires, thereby meeting the requirements of improving product reliability test.

The technical solution adopted by the present disclosure includes a touch panel including a substrate, an electrode, a first top coating, and a barrier layer. The electrode is disposed on the substrate. The first top coating is disposed on the substrate and has at least a moisture intrusion interface. The moisture intrusion interface is covered by the barrier layer.

In some embodiments, the barrier layer is formed by extending an adhesive layer. The barrier layer and the adhesive layer are integrally formed.

In some embodiments, a saturated water absorption of the barrier layer can be between 0.08 wt. % and 0.40 wt. %.

In some embodiments, a water vapor permeability of the barrier layer can be between 10 g/(m$^2$*day) and 5000 g/(m$^2$*day).

In some embodiments, a dielectric constant of the barrier layer is between 2.24 and 2.30, a saturated water absorption is about 0.1 wt. %, and a water vapor permeability is below 100 g/(m$^2$*day).

In some embodiments, the touch panel further includes at least a second top coating disposed between the first top coating and the adhesive layer.

In some embodiments, the moisture intrusion interface is covered by the second top coating.

In some embodiments, the electrode is made of metal nanowires.

In some embodiments, the touch panel further includes at least an outermost peripheral wire. The moisture intrusion interface is defined by at least one side of the outermost peripheral wire.

The technical solution adopted by the present disclosure is a device including the touch panel.

In some embodiments, the device includes a touch panel, an antenna structure, a coil, an electrode plate, a display, a portable phone, a tablet computer, a wearable device, a car device, a notebook computer, or a polarizer.

The technical solution adopted by the present disclosure is a touch display module including a substrate, a transparent conductive layer, a moisture barrier layer, and a display device. The transparent conductive layer is disposed on the substrate. The moisture barrier layer extends laterally on the transparent conductive layer and covers the transparent conductive layer, and the moisture barrier layer includes inorganic materials. The display device is disposed on the moisture barrier layer.

In some embodiments, inorganic materials include silicon nitrogen compounds, silicon oxide compounds, or a combination thereof.

In some embodiments, the thickness of the moisture barrier layer is between 30 nm and 110 nm.

In some embodiments, the moisture barrier layer extends along the sidewall of the transparent conductive layer to an inner surface of the substrate.

In some embodiments, the transparent conductive layer includes a matrix and a metal nanostructure is distributed in the matrix.

In some embodiments, the touch display module further includes a coating disposed between the moisture barrier layer and the transparent conductive layer.

In some embodiments, the moisture barrier layer extends along the sidewall of the coating to cover the coating.

In some embodiments, the touch display module further includes a light shielding layer disposed between the transparent conductive layer and the substrate.

In some embodiments, the moisture barrier layer extends along the sidewall of the light shielding layer to cover the light shielding layer.

In some embodiments, the touch display module further includes an adhesive layer disposed between the moisture barrier layer and the transparent conductive layer. The saturated water absorption of the adhesive layer is between 0.08 wt. % and 0.40 wt. %.

Another technical solution adopted by the present disclosure is a touch display module including a substrate, a transparent conductive layer, an adhesive layer, and a display device. The transparent conductive layer is disposed on the substrate. The adhesive layer extends laterally on the transparent conductive layer. The saturated water absorption of the adhesive layer is between 0.08 wt. % and 0.40 wt. %, and the water vapor permeability is between 37 g/(m$^2$*day) and 1650 g/(m$^2$*day). The display device is disposed on the adhesive layer.

In some embodiments, the dielectric constant value of the adhesive layer is between 2.24 and 4.30.

In some embodiments, the thickness of the adhesive layer is between 150 μm and 200 μm.

In some embodiments, the adhesive layer extends along the sidewall of the transparent conductive layer to an inner surface of the substrate.

In some embodiments, the touch display module further includes a coating disposed between the adhesive layer and the transparent conductive layer.

In some embodiments, the adhesive layer extends along the sidewall of the coating to cover the coating.

In some embodiments, the touch display module further includes a light shielding layer disposed between the transparent conductive layer and the substrate.

In some embodiments, the adhesive layer extends along the sidewall of the light shielding layer to cover the light shielding layer.

In some embodiments, the adhesive layer extends along the sidewall of the transparent conductive layer to an inner surface of the light shielding layer.

In some embodiments, the touch display module further includes a moisture barrier layer disposed between the adhesive layer and the transparent conductive layer, in which the moisture barrier layer includes inorganic materials.

The present disclosure provides a touch display module with a moisture barrier layer and/or an adhesive layer of suitable material. The moisture barrier layer and/or the adhesive layer of suitable material can reduce moisture intrusion, and the adhesive layer of suitable material also can lower the moisture transfer speed and the migration speed of metal ions produced by the metal nanowires. This can avoid electromigration of metal nanowires or slow down the time of electromigration of metal nanowires, thereby meeting the requirements of improving product reliability test. The moisture barrier layer and/or the adhesive layer has higher resistance from the moisture/water vapor.

BRIEF DESCRIPTION OF THE DRAWINGS

The various aspects of the content of the present disclosure can be best understood from the following detailed description when read together with the accompanying drawings. It is worth noting that, according to common practice in the industry, the various features are not drawn to scale. In fact, in order to clearly illustrate and discuss, the size of each feature may be arbitrarily increased or decreased.

DETAILED DESCRIPTION

Figure 1:
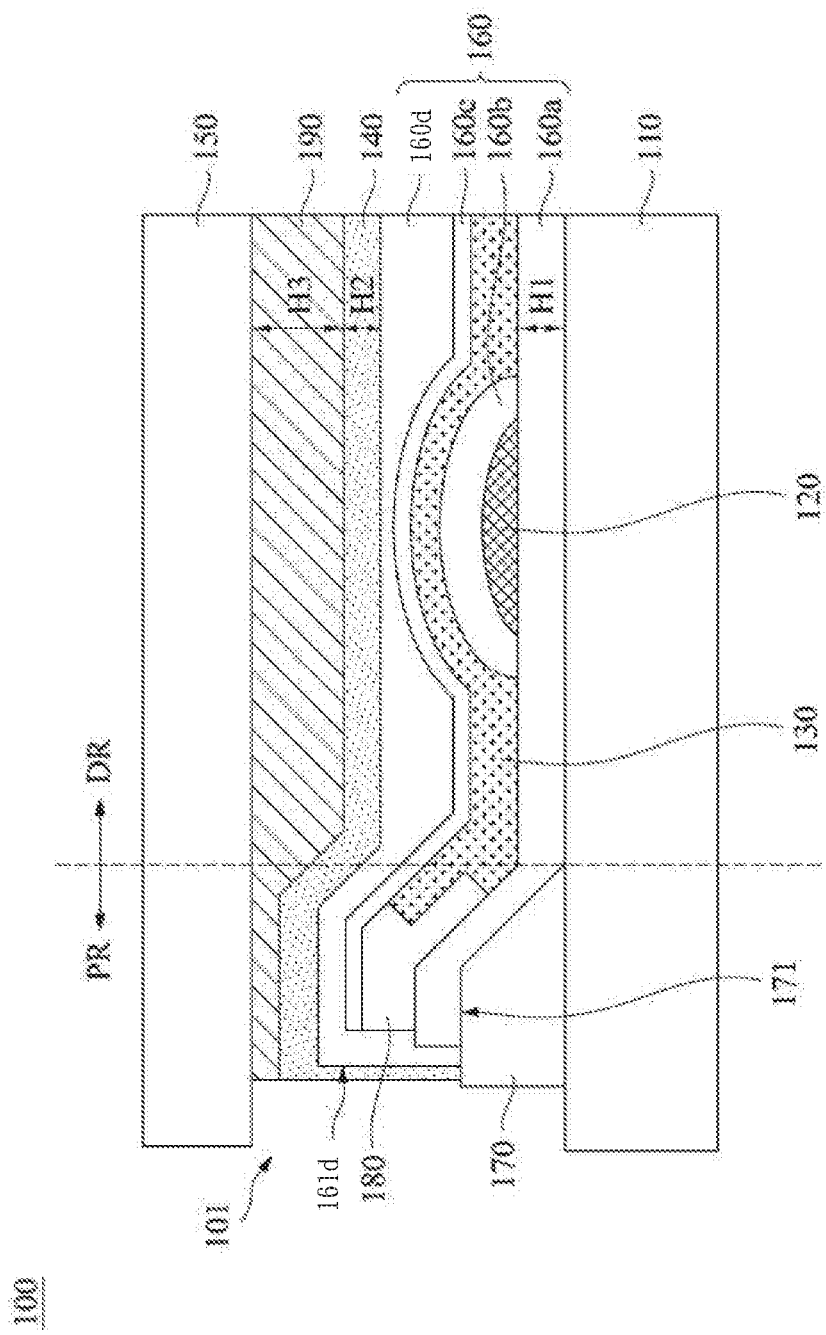
FIG. 1 is a schematic side view of a touch display module according to some embodiments of the present disclosure.

In the following, multiple embodiments of the present disclosure will be disclosed with the accompanying drawings. Many practical details will be described in the following description for clarity. However, it should be understood that these practical details should not be used to limit the present disclosure. That is to say, in some embodiments of the present disclosure, these practical details are unnecessary, and therefore should not be used to limit the present disclosure. In addition, in order to simplify the drawings, some conventionally used structures and elements are shown in the drawings in a simple schematic manner. Besides, for the convenience of readers, the size of each element in the drawings is not drawn according to actual scale.

Furthermore, relative terms such as "lower" or "bottom" and "upper" or "top" may be used herein to describe the relationship between one element and another element, as shown in the figures. It should be understood that relative terms are intended to include different orientations of the device other than the orientation shown in the figure. For example, if the device in one figure is turned over, the components described as being on the "lower" side of other components will be oriented on the "upper" side of other components. Therefore, the exemplary term "lower" may include an orientation of "lower" and "upper", depending on the specific orientation of the drawing. Similarly, if the device in one figure is turned over, elements described as "below" or "lower" other elements will be oriented "above" the other elements. Thus, the exemplary terms "below" or "lower" could include an orientation of above and below.

Please refer to FIG. 1, which is a schematic side view of a touch display module 100 according to an embodiment of the present disclosure. The touch display module 100 includes a substrate 110, a first conductive layer 120, a second conductive layer 130, a moisture barrier layer 140, and a display device 150. The first conductive layer 120, the second conductive layer 130, the moisture barrier layer 140, and the display device 150 are sequentially stacked on the substrate 110. The touch display module 100 further includes a plurality of coatings 160. The coatings 160 can be disposed, for example, between the substrate 110 and the first conductive layer 120, between the first conductive layer 120 and the second conductive layer 130, and between the second conductive layer 130 and the display device 150. In addition, the touch display module 100 has a display region DR and a peripheral region PR. The peripheral region PR can be provided with a light shielding layer 170 for shading, which can be made of, for example, a dark photoresist material or other opaque metal materials. The peripheral region PR of the touch display module 100 has at least one side 101 as a moisture intrusion surface. The present disclosure achieves the effect of extending the path and time of moisture intrusion by the inclusion of the moisture barrier layer 140, so as to achieve the purpose of protecting various electrodes (for example, the first conductive layer 120 and the second conductive layer 130) in the touch display module 100, thereby meeting the specification requirements for improving product reliability test. In the following description, a more detailed description will be given.

In some embodiments, the first conductive layer 120 can be disposed along the first axis (for example, the x-axis) to transmit the touch sensing signal of the touch display module 100 in the first axis to the peripheral region PR for the subsequent processing. In other words, the first conductive layer 120 can be used as a horizontal touch sensing electrode. In some embodiments, the first conductive layer 120 can be, for example, an indium tin oxide conductive layer. In other embodiments, the first conductive layer 120 can be, for example, an indium zinc oxide, cadmium tin oxide, or aluminum-doped zinc oxide conductive layer. Since the above-mentioned materials all have excellent light transmittance, the above-mentioned materials will not affect the optical properties of the touch display module 100 (for example, optical transmittance, and clarity).

In some embodiments, the second conductive layer 130 can be disposed along the second axis (for example, the y-axis) to transmit the touch sensing signal of the touch display module 100 in the second axis to the peripheral region PR for the subsequent processing. In other words, the second conductive layer 130 can be used as a vertical touch sensing electrode. In some embodiments, the second conductive layer 130 can include a matrix and a plurality of metal nanowires (also referred to as a metal nanostructure) distributed in the matrix. The matrix can include a polymer or a mixture thereof, thereby imparting specific chemical, mechanical, and optical properties to the second conductive layer 130. For example, the matrix can provide good adhesion between the second conductive layer 130 and other layers. For another example, the matrix can also provide good mechanical strength for the second conductive layer 130. In some embodiments, the matrix can include a specific polymer, so that the second conductive layer 130 has additional surface protection against scratches and abrasion, thereby enhancing the surface strength of the second conductive layer 130. The above-mentioned specific polymer can be, for example, polyacrylate, epoxy resin, polyurethane, polysiloxane, polysilane, poly(silicon-acrylic acid), or any combination of the above. In some embodiments, the matrix can further include a surfactant, a crosslinker, a stabilizer (for example, including but not limitation, an antioxidant or an ultraviolet light stabilizer), a polymerization inhibitor, or a combination of any of the above, thereby enhancing the ultraviolet (UV) performance of the second conductive layer 130 and extending its service life.

In some embodiments, metal nanowires can include, but are not limited to, silver nanowires, gold nanowires, copper nanowires, nickel nanowires, or any of the foregoing combinations. In more detail, "metal nanowires" in the present application is a collective noun, which refers to a collection of metal wires including multiple metal elements, metal alloys, or metal compounds (including metal oxides). In addition, the number of metal nanowires included in the second conductive layer 130 is not used to limit the present disclosure. The metal nanowires of the present disclosure have excellent light transmittance, and therefore can provide good conductivity for the second conductive layer 130 without affecting the optical properties of the touch display module 100.

In some embodiments, the cross-sectional size (i.e., the diameter of the cross-section) of a single metal nanowire can be less than 500 nm, preferably less than 100 nm, and more preferably less than 50 nm, so that the second conductive layer 130 has a lower haze. In detail, if the cross-sectional size of a single metal nanowire is greater than 500 nm, the single metal nanowire would be too thick, resulting in the haze of the second conductive layer 130 being too high, thereby affecting the visual clarity of the display region DR. In some embodiments, the aspect ratio (length:diameter) of a single metal nanowire can be between 10 and 100,000, so that the second conductive layer 130 can have a lower resistivity, a higher light transmittance, and a lower haze. In detail, if the aspect ratio of a single metal nanowire is less than 10, the conductive network may not be formed well, resulting in excessively high resistivity of the second conductive layer 130. Therefore, the metal nanowires may be distributed in the matrix with a greater arrangement density (that is, the number of metal nanowires included in the second conductive layer 130 per unit volume) in order to increase the conductivity of the second conductive layer 130. However, the greater density may result in low light transmittance of the second conductive layer 130 and high haze. It should be understood that other terms such as silk, fiber, or tube can also have the above-mentioned cross-sectional dimensions and aspect ratios, and are also within the scope of the present disclosure.

As mentioned above, the coating 160 can be disposed between the substrate 110 and the first conductive layer 120, between the first conductive layer 120 and the second conductive layer 130, and between the second conductive layer 130 and the display device 150 to achieve the effect of protection, insulation, or adhesion. In some embodiments, the coating 160 disposed between the substrate 110 and the first conductive layer 120 can also be referred to as a bottom coating 160a, the coating 160 disposed between the first conductive layer 120 and the second conductive layer 130 can also be referred to as a middle coating 160b, and the coating 160 disposed between the second conductive layer 130 and the display device 150 can also be referred to as a top coating (such as a first top coating 160c). In some embodiments, the bottom coating 160a and/or the first top coating 160c can further extend to an inner surface 171 of the light shielding layer 170 located in the peripheral region PR (that is, the surface of the light shielding layer 170 facing away from the substrate 110). In some embodiments, the first top coating 160c can extend laterally and cover the entire second conductive layer 130. In some embodiments, the top coating can have more than two layers, such as the two layers depicted in FIG. 1. The layer contacting with the second conductive layer 130 can be referred to as the first top coating 160c, and the layer contacting with the moisture barrier layer 140 can be referred to as a second top coating 160d, but the present disclosure is not limited to this. In some embodiments, the second top coating 160d located at the top can further extend along the sidewall of each layer (for example, the sidewalls of the first top coating 160c and the bottom coating 160a) to the inner surface 171 of the light shielding layer 170. Therefore, the touch display module 100 is protected from the side of touch display module 100. In some embodiments, the touch display module 100 can further include a peripheral wire 180 located in the peripheral region PR and between the first top coating 160c and the bottom coating 160a. The peripheral wire 180 can electrically connect to the second conductive layer 130 and a flexible circuit board (not shown) to further transmit the touch sensing signal generated by the second conductive layer 130 to an external integrated circuit for the subsequent processing. The second top coating 160d at the top can further extend along the sidewall of the peripheral wire 180 to the inner surface 171 of the light shielding layer 170. In some embodiments, the thickness of the coating 160 (such as the thickness H1 of the bottom coating 160a) can be between 20 nm and 10 μm, between 50 nm and 200 nm, or between 30 nm and 100 nm, thereby achieving good protection, insulation, or adhesion, and avoiding excessive thickness of the touch display module 100. In detail, if the thickness of the coating 160 is less than the above lower limit, it may cause the coating 160 to fail to provide good protection, insulation, or adhesion functions. If the thickness of the coating 160 is greater than the above upper limit, it may cause the overall thickness of the touch display module 100 to be too large, which is not conducive to the process and seriously affects the appearance.

In some embodiments, the first top coating 160c and/or the second top coating 160d can form a composite structure with the second conductive layer 130, and the composite structure has certain specific chemical, mechanical, and optical properties. For example, the first top coating 160c can provide good adhesion between the composite structure and other layers. For another example, the first top coating 160c can provide good mechanical strength for the composite structure. In some embodiments, the first top coating 160c can include a specific polymer, so that the composite structure has additional surface protection against scratches and abrasion, thereby enhancing the surface strength of the composite structure. The above-mentioned specific polymer can be, for example, polyacrylate, polyurethane, epoxy resin, polysiloxane, polysilane, poly(silicon-acrylic acid), or any combination of the above. It is worth noting that the drawings herein show the first top coating 160c and the second conductive layer 130 as different layers. However, in some embodiments, the material used to make the first top coating 160c can penetrate between the metal nanowires of the second conductive layer 130 before being cured or in a pre-cured state to form a filler. Therefore, when the first top coating 160c is cured, the metal nanowires can also be embedded in the first top coating 160c.

In some embodiments, the material of the coating 160 can be, for example, insulating (non-conductive) resin or other organic materials. For example, the coating 160 can include polyethylene, polypropylene, polyvinyl butyral, polycarbonate, acrylonitrile-butadiene-styrene copolymer, poly(3,4-ethylenedioxythiophene), poly(styrene sulfonic acid), ceramic, or any combination of the above. In some embodiments, coating 160 can also include, but is not limited to, any of the following polymers: polyacrylic resin (for example, polymethacrylate, polyacrylate, and polyacrylonitrile); polyvinyl alcohol; polyester (for example, polyethylene terephthalate, polyester naphthalate and polycarbonate); polymer with high aromaticity (for example, phenolic resin or cresol-formaldehyde, polyvinyl toluene, polyvinyl xylene, polysulfone, polysulfide, polystyrene, polyimide, polyamide, polyamideimide, polyetherimide, polyphenylene and polyphenyl ether); polyurethane; epoxy resin; polyolefin (for example, polypropylene, polymethylpentene, and cycloolefin); polysiloxanes and other silicon-containing polymers (for example, polysilsesquioxane and polysilane); synthetic rubber (for example, ethylene-propylene-diene monomer, ethylene propylene rubber and styrene butadiene rubber; fluoropolymer (for example, polyvinylidene fluoride, polytetrafluoroethylene and polyhexafluoropropylene); cellulose; polyvinyl chloride; polyacetate; norbornene; and copolymers of fluoro-olefin and hydrocarbon olefin.

As mentioned above, since the material of the coating 160 is a resin or organic material with good hydrophilicity, and the coating 160 extends to the peripheral region PR, the peripheral region PR of the touch display module 100 has at least one side 101 function as the moisture intrusion surface. In detail, the moisture intrusion surface of the touch display module 100 shown in FIG. 1 is a sidewall 161d of the second top coating 160d. In other embodiments, in the case that the topmost second top coating 160d does not extend along the sidewall of each layer to the inner surface 171 of the light shielding layer 170, the moisture intrusion surface can be the sidewalls of the first top coating 160c, the peripheral wire 180, and the bottom coating 160a.

In some embodiments, the moisture barrier layer 140 extends laterally on the topmost second top coating 160d and covers the entirely topmost second top coating 160d. In addition, the moisture barrier layer 140 further extends along the sidewall 161d of the topmost second top coating 160d to the inner surface 171 of the light shielding layer 170 to cover the sidewall 161d of the topmost second top coating 160d. Therefore, the moisture in the environment is prevented from invading and attacking the electrode (for example, the second conductive layer 130) from the moisture intrusion surface. In this way, it is possible to prevent the metal nanowires in the second conductive layer 130 from gathering or even chemical reactions to precipitate metal ions or electrons, and to prevent the short circuit of the peripheral wire 180, thereby enhancing the electrical sensitivity of the second conductive layer 130. In some embodiments, the moisture barrier layer 140 can be, for example, conformally formed on the surface of the topmost second top coating 160d and the sidewall 161d. In some embodiments, the moisture barrier layer 140 can, for example, include inorganic materials including silicon nitride, silicon oxide, or a combination thereof. For example, the silicon nitride compound can be silicon nitride ($Si_3N$), and the silicon oxide compound can be silicon dioxide ($SiO_2$). In other embodiments, the moisture barrier layer 140 can be, for example, mullite, alumina, silicon carbide, carbon fiber, $MgO$—$Al_2O_3$—$SiO_2$, $Al_2O_3$—$SiO_2$, $MgO$—$Al_2O_3$—$SiO_2$—$Li_2O$, or a combination of inorganic materials. Compared with resins or organic materials, inorganic materials have lower hydrophilicity, so they can effectively prevent moisture in the environment from invading and attacking the electrode.

In some embodiments, the thickness H2 of the moisture barrier layer 140 can be between 30 nm and 110 nm to achieve a good water blocking effect and prevent the overall thickness of the touch display module 100 from being too large. In detail, if the thickness H2 of the moisture barrier layer 140 is less than 30 nm, the moisture in the environment may not be effectively isolated. If the thickness H2 of the moisture barrier layer 140 is greater than 110 nm, the overall thickness of the touch display module 100 may be too large, which is not conducive to the process and seriously affects the appearance. In addition, the selection of the inorganic materials of the moisture barrier layer 140 and the combination of the thickness H2 of the moisture barrier layer 140 can make the moisture barrier layer 140 achieve a better water blocking effect. For example, if a silicon nitride compound is used alone as the inorganic material of the moisture barrier layer 140, the thickness H2 of the moisture barrier layer 140 can be set to about 30 nm. For another example, if a silicon nitride compound and a silicon oxide compound are used as the inorganic material of the moisture barrier layer 140, the thickness H2 of the moisture barrier layer 140 can be set between 40 nm and 110 nm, in which the silicon nitride compound and the silicon oxide compound can be stacked in layers. The thickness of the silicon nitride compound layer can be between 10 nm and 30 nm, and the thickness of the silicon oxide compound layer can be between 30 nm and 80 nm.

In some embodiments, apart from the aforementioned touch panel components, the touch display module 100 can further include an optically clear adhesive (OCA) layer 190 disposed between the display device 150 and the moisture barrier layer 140. The optically clear adhesive layer 190 can attach the display device 150 onto the moisture barrier layer 140, so that the display device 150 and the substrate 110 can jointly sandwich each functional layer (for example, the first conductive layer 120, the second conductive layer 130, the moisture barrier layer 140, the coating 160, the light shielding layer 170, the peripheral wire 180, and the adhesive layer 190) of the touch panel between them. In some embodiments, the adhesive layer 190 can include an insulating material such as rubber, acrylic, or polyester.

In some embodiments, the adhesive layer 190 can extend to the peripheral region PR and form at least one moisture intrusion surface in the peripheral region PR. In some embodiments, the thickness H3 of the adhesive layer 190 can be between 150 μm and 200 μm. The thickness H3 of the adhesive layer 190 can affect the path that the moisture in the environment travels when the moisture passes through the adhesive layer 190. The path and time of the moisture passing through the adhesive layer 190 can be increased by setting the thickness H3 of the adhesive layer 190 between 150 μm and 200 μm. In this way, the moisture intrusion from the environment can effectively be slowed down, thereby reducing the possibility of electromigration of the metal nanowires, and avoiding the overall thickness of the touch display module 100 from being too large. In detail, if the thickness H3 of the adhesive layer 190 is less than 150 μm, the time it takes for the moisture in the environment to pass through the adhesive layer 190 may be too short, so the moisture in the environment can easily invade and attack the electrode. If the thickness H3 of 190 is greater than 150 μm, the overall thickness of the touch display module 100 may be too large, and this is not conducive to the manufacturing process and seriously affects the appearance.

In summary, the touch panel/touch display module 100 of the present disclosure can achieve a good moisture barrier effect, thereby meeting the specification requirements for improving the product reliability test. In some embodiments, the touch display module 100 can pass an electrical test lasting about 504 hours under specific test conditions (for example, a temperature of 65° C., a relative humidity of 90%, and a voltage of 11 volts). This shows that the touch display module 100 can have good reliability test results.

Figure 2:
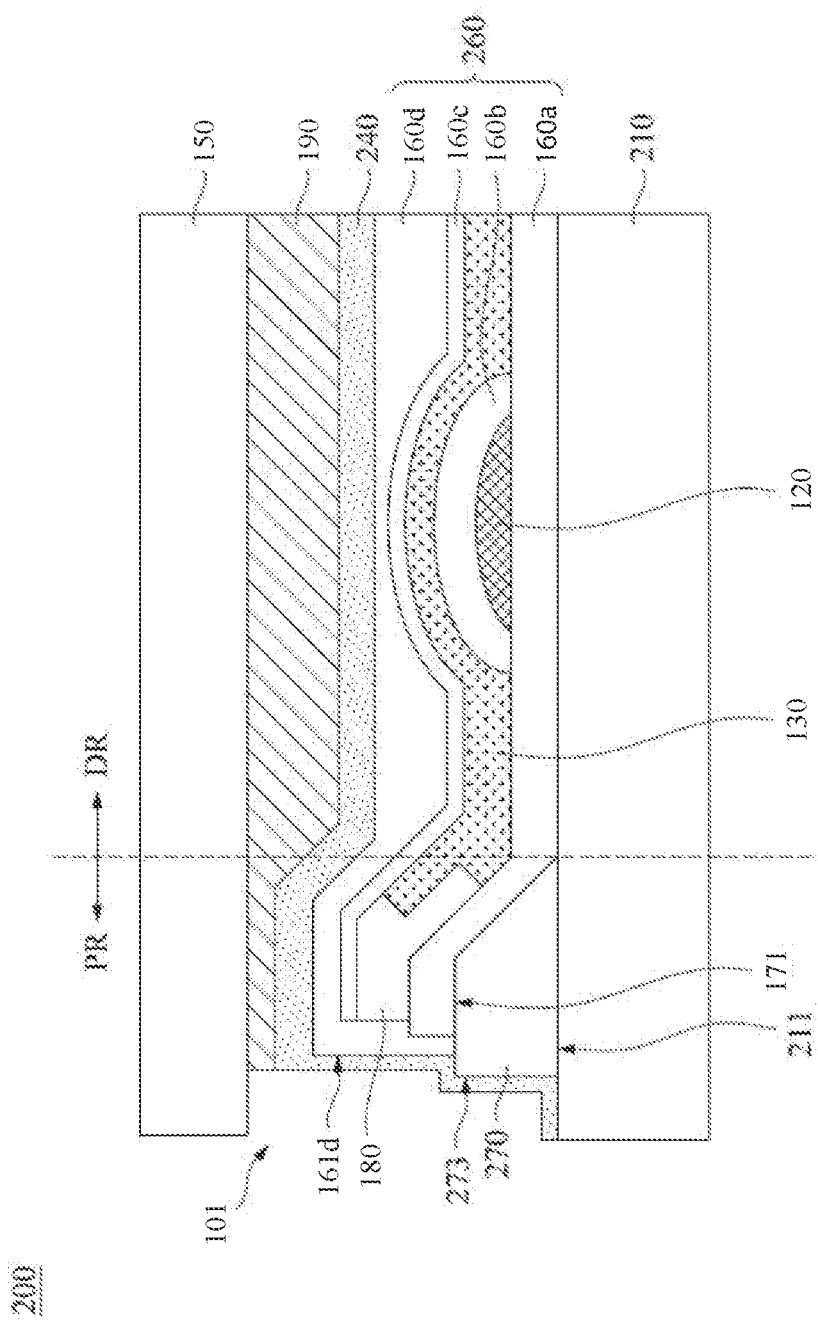
FIG. 2 is a schematic side view of a touch display module according to other embodiments of the present disclosure.

Please refer to FIG. 2, which is a schematic side view of a touch display module 200 according to an embodiment of the present disclosure. At least one difference between the touch display module 200 in FIG. 2 and the touch display module 100 in FIG. 1 is that the moisture barrier layer 240 of the touch display module 200 further extends along the sidewall 273 of the light shielding layer 270 to the inner surface 211 of the substrate 210, and covers the sidewall 273 of the light shielding layer 270. In some embodiments, the moisture barrier layer 240 can further extend laterally on the inner surface 211 of the substrate 210 and cover a part of the inner surface 211 of the substrate 210. For example, the moisture barrier layer 240 can be conformally formed on the surface and the sidewall of each layer (for example, the coating 260, the light shielding layer 270, and the substrate 210). In this way, the moisture barrier layer 240 can more completely protect the touch display module 200 from the side of the touch display module 200, so as to better prevent or slow down the moisture intrusion from the environment and attack the electrode. In some embodiments, the touch display module 200 can pass an electrical test lasting about 504 hours under specific test conditions (for example, a temperature of 65° C., a relative humidity of 90%, and a voltage of 11 volts). This shows that the touch display module 200 can have good reliability test results.

Figure 3:
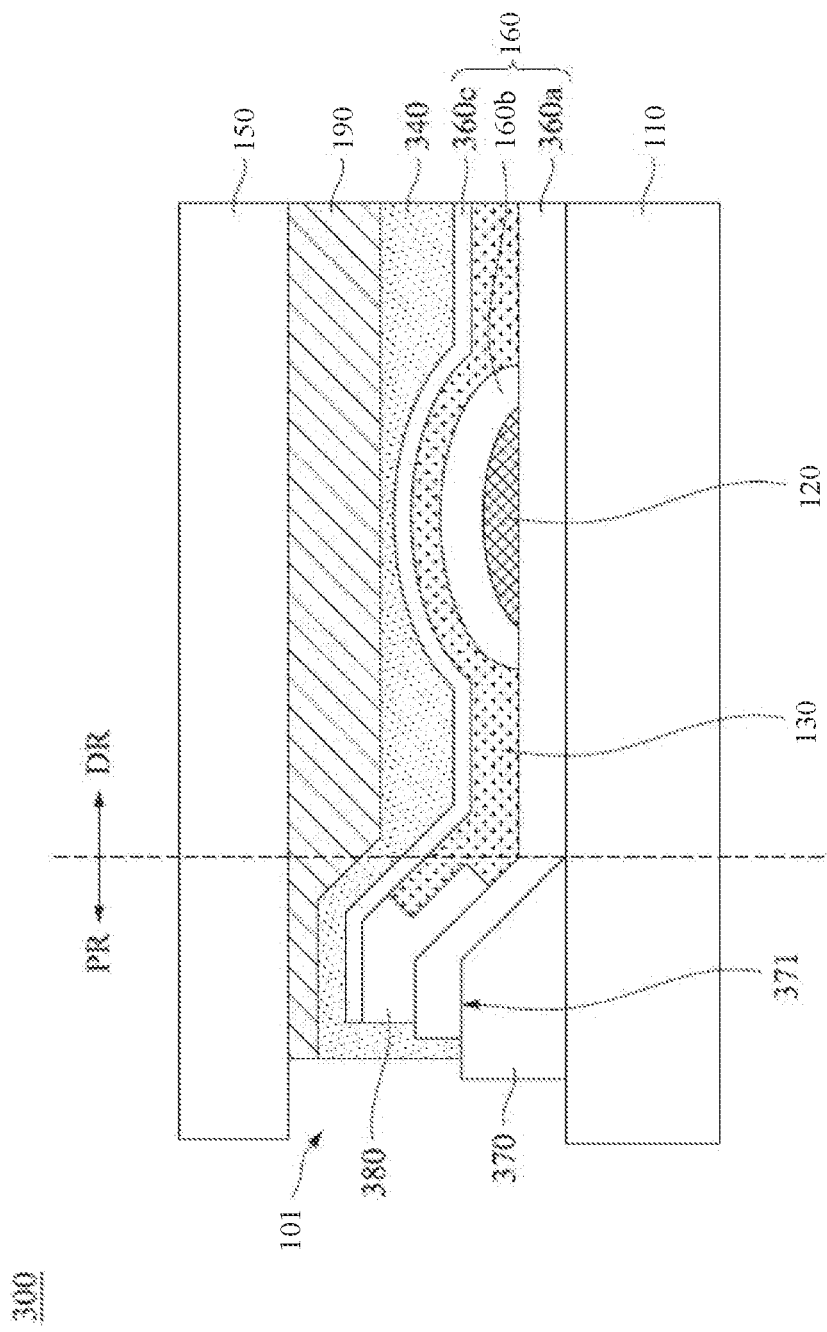
FIG. 3 is a schematic side view of a touch display module according to other embodiments of the present disclosure.

Please refer to FIG. 3, which is a schematic side view of a touch display module 300 according to an embodiment of the present disclosure. At least one difference between the touch display module 300 in FIG. 3 and the touch display module 100 in FIG. 1 is that the moisture barrier layer 340 in the touch display module 300 replaces the topmost top coating 160c shown in FIG. 1. In other words, the touch display module 300 in FIG. 3 has only one layer of top coating 360c. The top coating 360c is the topmost top coating 360c of the touch display module 300, and the moisture barrier layer 340 directly covers the surface of the top coating 360c. In addition, the moisture barrier layer 340 further extends along the sidewalls of the top coating 360c, the peripheral wire 380, and the bottom coating 360a to the inner surface 371 of the light shielding layer 370, and covers the sidewalls of the top coating 360c, the peripheral wire 380, and the bottom coating 360a. In this way, the moisture barrier layer 340 can protect the touch display module 300 from the side of the touch display module 300, thereby effectively avoiding or slowing down the moisture intrusion from the environment and attacking the electrode. In addition, since the touch display module 300 in FIG. 3 eliminates a layer of top coating 160c compared to the touch display module 100 in FIG. 1, the touch display module 300 in FIG. 3 can have a smaller thickness than the touch display module 100 in FIG. 1, thereby meeting the requirements of thinner products. In some embodiments, the touch display module 300 can pass an electrical test lasting about 504 hours under specific test conditions (for example, a temperature of 65° C., a relative humidity of 90%, and a voltage of 11 volts). This shows that the touch display module 300 can have good reliability test results.

Figure 4:
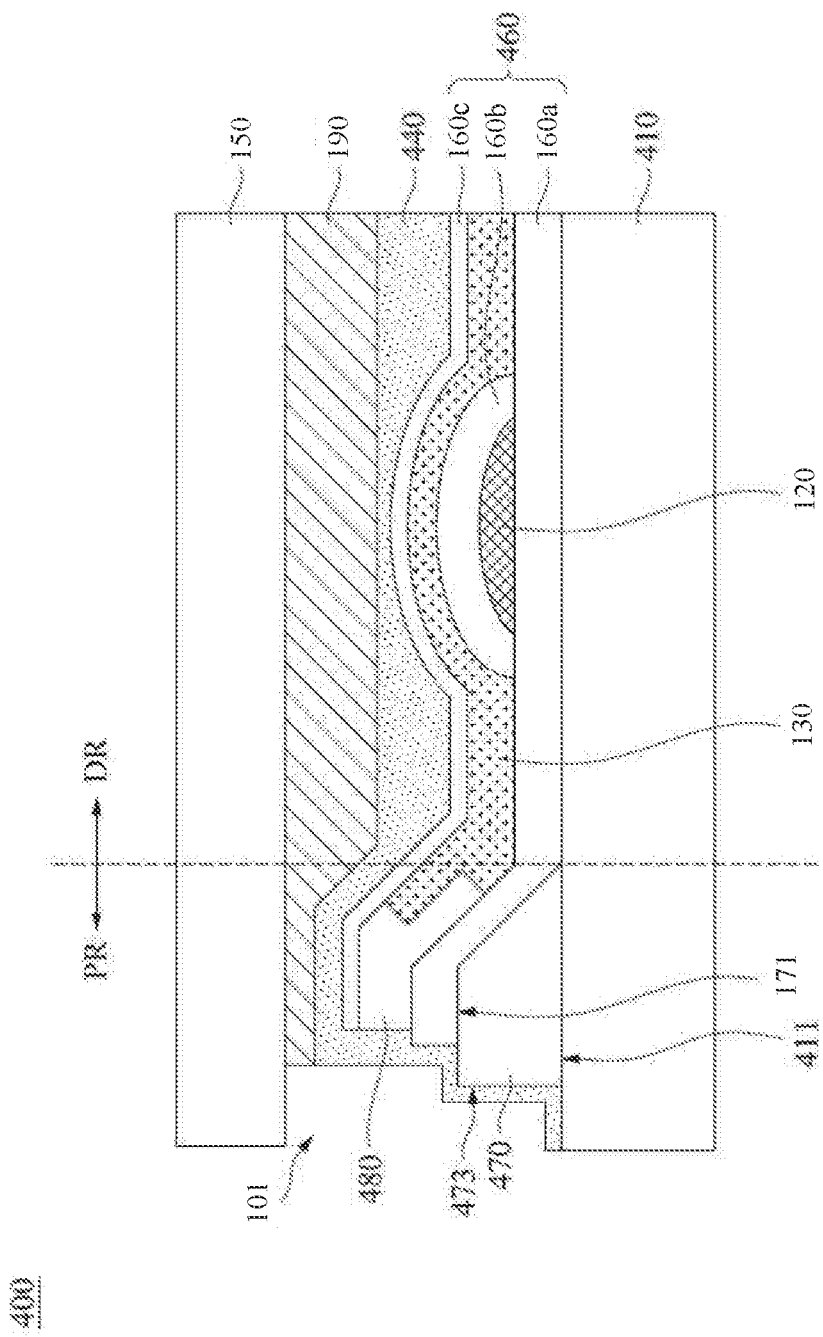
FIG. 4 is a schematic side view of a touch display module according to other embodiments of the present disclosure.

Please refer to FIG. 4, which is a schematic side view of a touch display module 400 according to an embodiment of the present disclosure. At least one difference between the touch display module 400 in FIG. 4 and the touch display module 300 in FIG. 3 is that the moisture barrier layer 440 of the touch display module 400 extends further along the sidewall 473 of the light shielding layer 470 to an inner surface 411 of the substrate 410, and covers the sidewall 473 of the light shielding layer 470. In some embodiments, the moisture barrier layer 440 can further extend laterally on the inner surface 411 of the substrate 410 and cover a part of the inner surface 411 of the substrate 410. In some embodiments, the moisture barrier layer 440 can be, for example, conformally formed on the surface and the sidewall of each layer (for example, a coating 460, a peripheral wire 480, the light shielding layer 470, and substrate 410). In this way, the moisture barrier layer 440 can more completely protect the touch display module 400 from the side of the touch display module 400, so as to better prevent or slow down the moisture intrusion from the environment and attack the electrode. In some embodiments, the touch display module 400 can pass an electrical test lasting about 504 hours under specific test conditions (for example, a temperature of 65° C., a relative humidity of 90%, and a voltage of 11 volts). This shows that the touch display module 400 can have good reliability test results.

Figure 5:
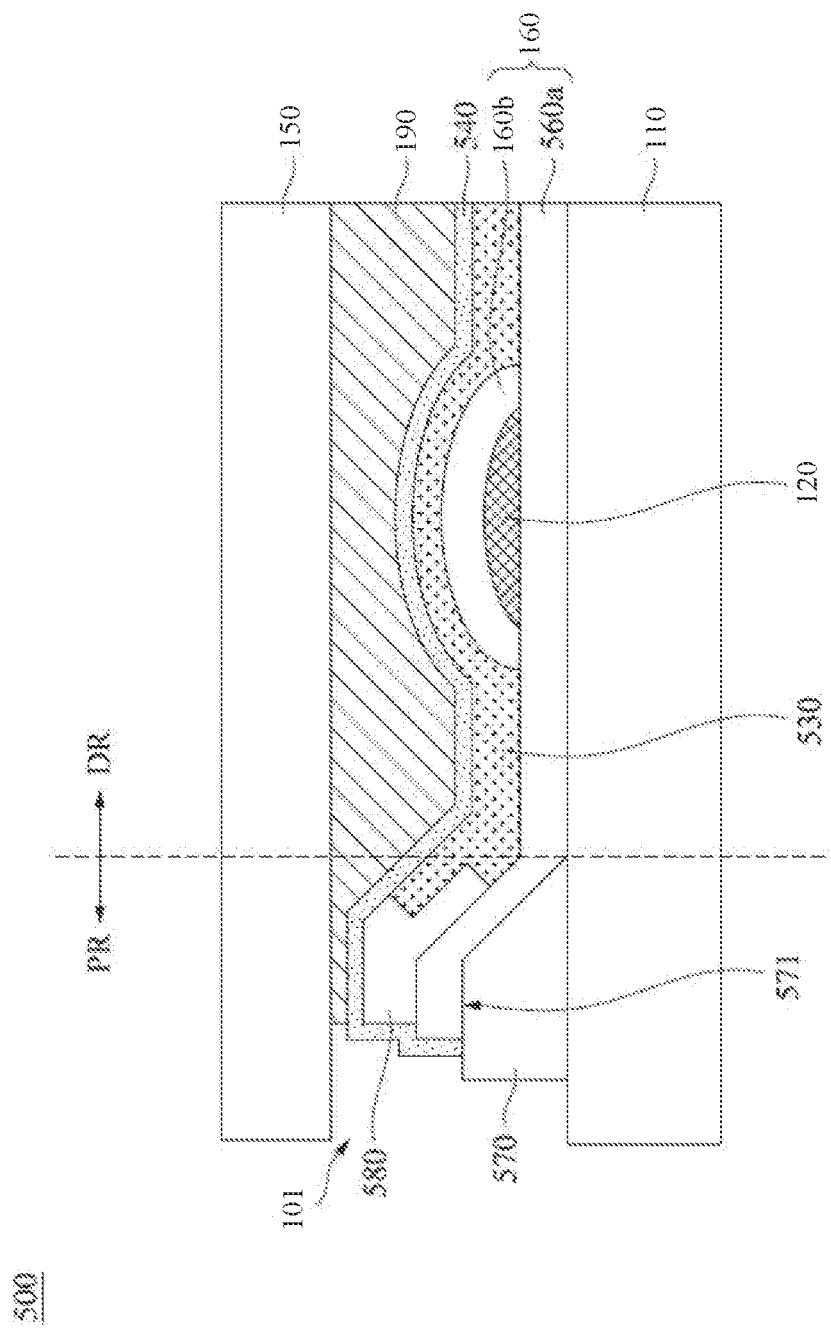
FIG. 5 is a schematic side view of a touch display module according to other embodiments of the present disclosure.

Please refer to FIG. 5, which is a schematic side view of a touch display module 500 according to an embodiment of the present disclosure. At least one difference between the touch display module 500 in FIG. 5 and the touch display module 300 in FIG. 3 is that the moisture barrier layer 540 in the touch display module 500 replaces the topmost top coating 360c shown in FIG. 3. In other words, the touch display module 500 in FIG. 5 does not have any top coating, and a moisture barrier layer 540 directly extends laterally on the surfaces of a second conductive layer 530 and a peripheral wire 580, and covers the second conductive layer 530 and the peripheral wire 580. In addition, the moisture barrier layer 540 further extends along the sidewalls of the peripheral wire 580 and a bottom coating 560a to an inner surface 571 of a light shielding layer 570, and covers the sidewalls of the peripheral wire 580 and the bottom coating 560a. In this way, the moisture barrier layer 540 can protect the touch display module 500 from the side of the touch display module 500, thereby effectively avoiding or slowing down the moisture intrusion from the environment and attacking the electrode. In addition, since the touch display module 500 in FIG. 5 does not have any top coating, the touch display module 500 in FIG. 5 can have a smaller thickness than the touch display module 300 in FIG. 3, thereby achieving the requirement of thinner products. In some embodiments, the touch display module 500 can pass an electrical test lasting about 504 hours under specific test conditions (for example, a temperature of 65° C., a relative humidity of 90%, and a voltage of 11 volts). This shows that the touch display module 500 can have good reliability test results.

Figure 6:
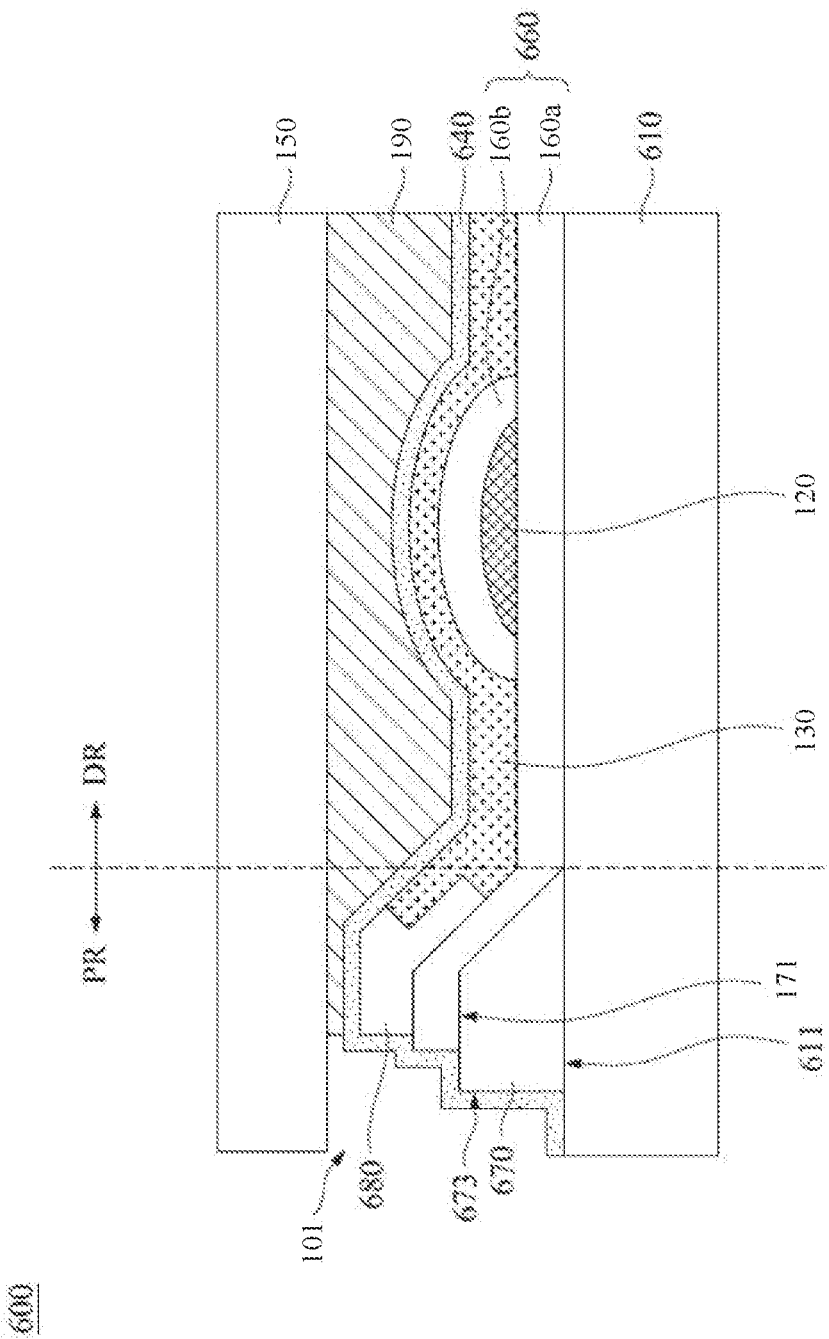
FIG. 6 is a schematic side view of a touch display module according to other embodiments of the present disclosure.

Please refer to FIG. 6, which is a schematic side view of a touch display module 600 according to an embodiment of the present disclosure. At least one difference between the touch display module 600 in FIG. 6 and the touch display module 500 in FIG. 5 is that a moisture barrier layer 640 of the touch display module 600 extends further along a sidewall 673 of the light shielding layer 670 to an inner surface 611 of a substrate 610, and covers the sidewall 673 of the light shielding layer 670. In some embodiments, the moisture barrier layer 640 can further extend laterally on the inner surface 611 of the substrate 610 and cover a part of the inner surface 611 of the substrate 610. In some embodiments, the moisture barrier layer 640 can be formed conformally on the surface and sidewall of each layer (for example, a coating 660, a peripheral wire 680, the light shielding layer 670, and the substrate 610). In this way, the moisture barrier layer 640 can more completely protect the touch display module 600 from the side of the touch display module 600, so as to better prevent or slow down the moisture intrusion from the environment and attack the electrode. In some embodiments, the touch display module 600 can pass an electrical test lasting about 504 hours under specific test conditions (for example, a temperature of 65° C., a relative humidity of 90%, and a voltage of 11 volts). This shows that the touch display module 600 has good reliability test results.

In addition to avoiding or slowing down the moisture intrusion from the environment and attacking the electrode by the setting of the moisture barrier layer, in some embodiments, the selection of material characteristics and/or the setting of the structure can also be used to avoid inducing electromigration or slowing down the time of electromigration of metal nanowires, thereby meeting the specification requirements for improving the product reliability test.

Figure 7:
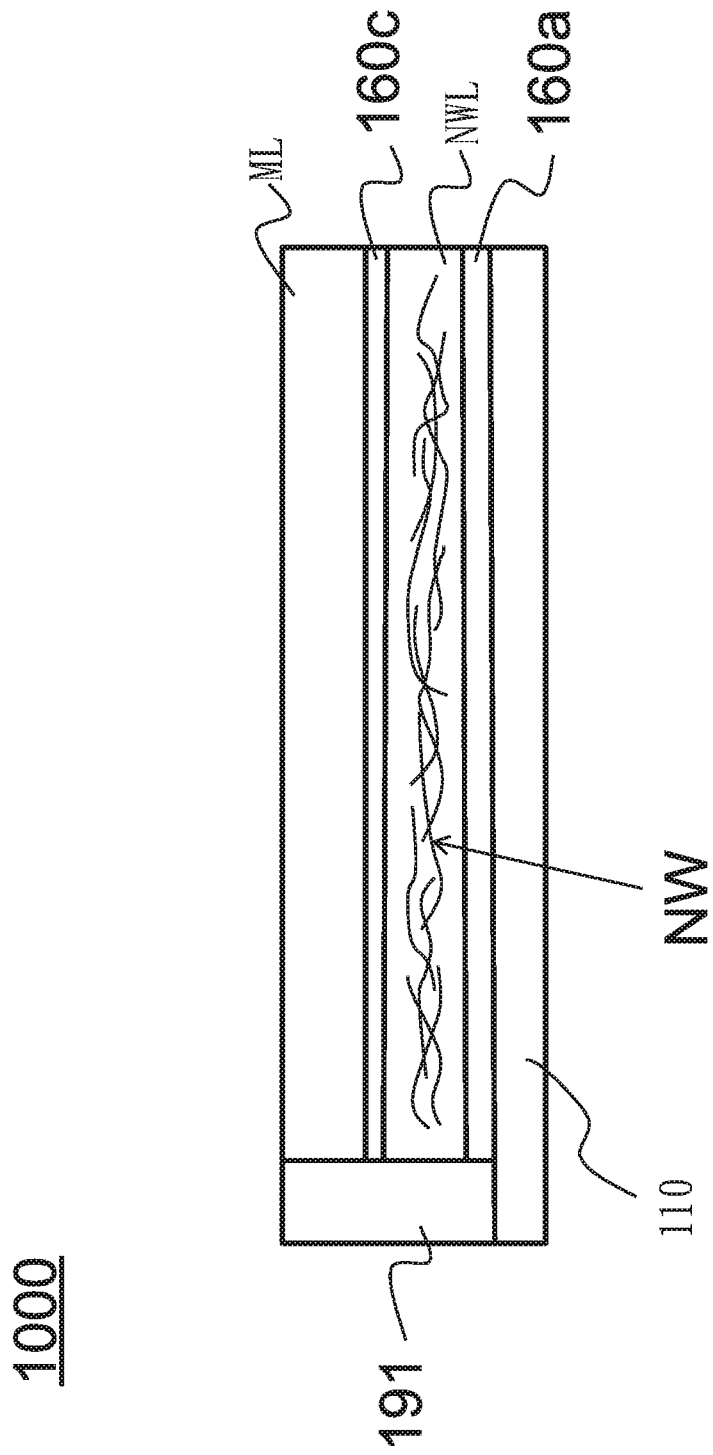
FIG. 7 is a schematic side view of a touch panel according to other embodiments of the present disclosure.

Please refer to FIG. 7 first, which is a schematic partial cross-sectional view of a touch panel 1000 according to some embodiments of the present disclosure. The touch panel 1000 in FIG. 7 includes the substrate 110 and a plurality of functional layers/structural layers on the substrate 110, in which at least one of the functional layers on the substrate 110 is a polymer layer, and which has at least one moisture Intrusion interface. For example, the first top coating 160c on the substrate 110 is made of polymer/resin material, and the first top coating 160c has a side in the peripheral region PR (the left side depicted in FIG. 7 is the extended surface in the thickness direction of the polymer layer). Since the left side is close to the outside of the device and exposed to the environment, the water vapor/moisture in the atmosphere can easily enter the first top coating 160c from the left side, and then affect the reliability of the entire touch panel 1000. In some embodiments of the present disclosure, the barrier layer 191 is disposed on the moisture intrusion interface (that is, the aforementioned side) to avoid the exposure of the moisture intrusion interface and to also achieve the effect of extending the path of moisture intrusion, so that the touch panel 1000 can be protected. The purpose of this, in particular, is to slow down the water vapor/moisture attack on the electrode. In one example, the electrode of the touch panel 1000 (such as the aforementioned second conductive layer 130) is made of a metal nanowire layer NWL including at least a metal nanowire (metal nanowires) NW. After passing through specific test conditions (65° C., humidity 90%, 11 volt voltage), the electrical test can pass the test time of 504 hours. It is worth noting that, for the sake of simplicity, the actual state is not drawn on the right side in FIG. 7. If the aforementioned moisture intrusion interface (such as the right side of the first top coating 160c) also appears on the actual product, the barrier layer 191 can also be set on the side.

In one example, the barrier layer 191 is made of a material with low water permeability (WVTR, or water vapor transmission rate), and its width is about 10 to 500 μm. In other words, the water vapor/moisture in the atmosphere needs to pass through the barrier layer 191 before it comes into contact with the above-mentioned moisture intrusion interface. The barrier layer provides at least a 10 to 500 μm path to delay the time before the electrode of the touch panel 1000 is attacked and to cause invalidation. The low water permeability referred to in this example refers to water permeability below 1500 (g/m$^2$*day) (the water permeability can be measured under the temperature/humidity condition of 50° C./90% or 65° C./90%). The barrier layer 191 at least uses the low water permeability and/or thickness (that is, the distance passed through by water vapor/moisture) and so on to delay the time before for the electrode of the touch panel 1000 is attacked.

As shown in FIG. 7, the substrate 110 can further include the bottom coating 160a. The bottom coating 160a is located between the substrate 110 and the metal nanowire layer NWL. The characteristics of the bottom coating 160a can be similar to the first top coating 160c, so that the barrier layer 191 is disposed and covers the side of the bottom coating 160a to extend the time for water vapor to enter from the side of the bottom coating 160a and enter the inner device along the bottom coating 160a. In other words, the barrier layer 191 can cover two or more moisture intrusion interfaces.

In one example, the multiple functional layers/structural layers on the substrate 110 can include the peripheral wire 180, the coating (such as the first top coating 160c, the bottom coating 160a, etc.), the touch sensing electrode TE, and so on. The peripheral wire 180 can be formed by the conductive layer ML, for example, by a patterning process.

Figure 8:
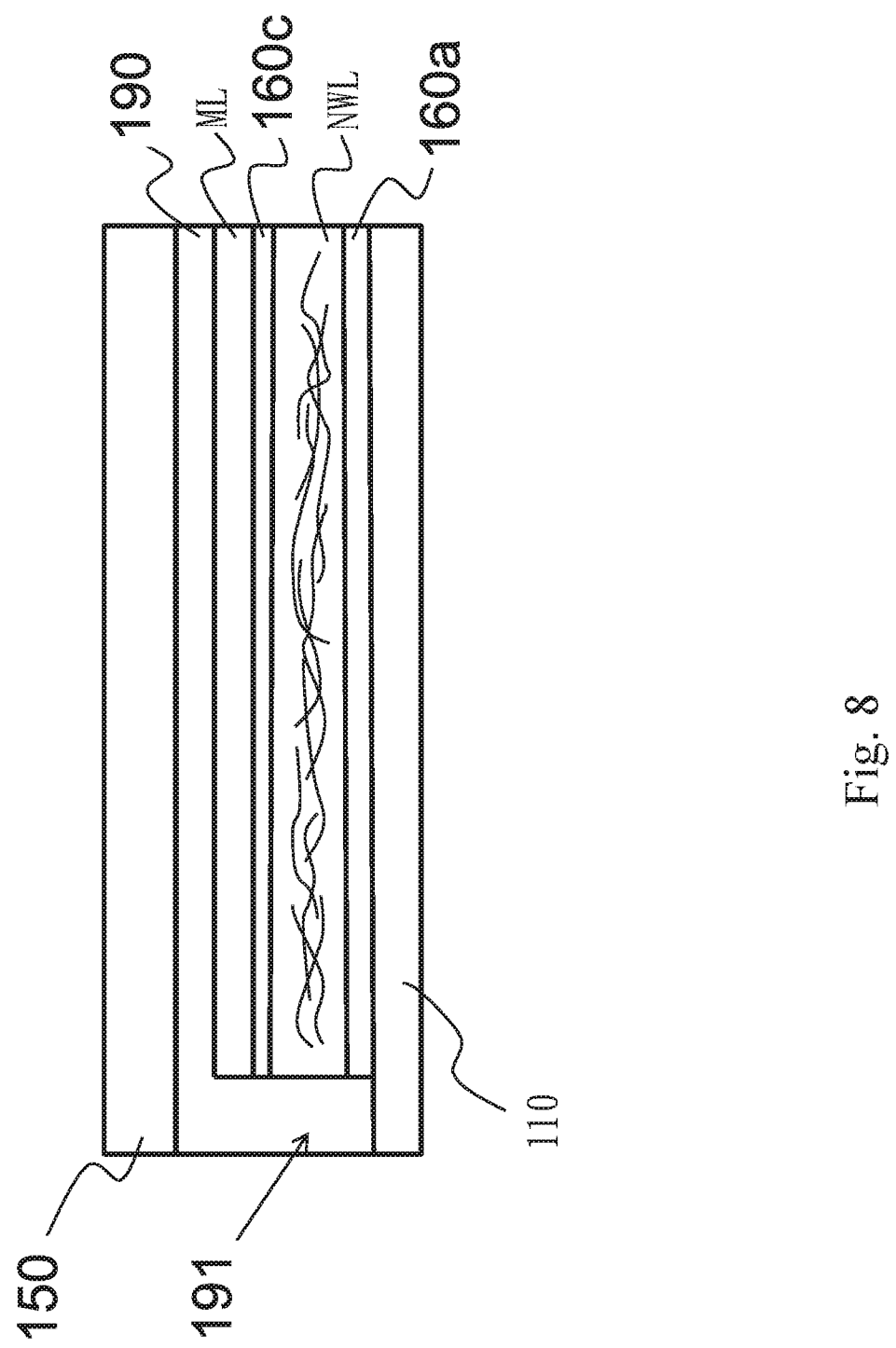
FIG. 8 is a schematic side view of a touch panel according to other embodiments of the present disclosure.

Please refer to FIG. 8, the touch panel 1000 can be assembled with the adhesive layer 190 and the display device 150 to form a display having a touch function. In one example, the adhesive layer 190 can be optically clear adhesive (OCA) or the like. In one example, an optically clear adhesive with low water permeability can be selected, such as acrylic or rubber series material. The optically clear adhesive is not only coated on the front surface of the touch panel 1000 (that is, the surface where the display device 150 is bonded and assembled), but also can be extended into an L-shaped structure (viewed in a cross-sectional view). The extended part can be set on the moisture intrusion interface (that is, the aforementioned side) to form a barrier layer 191. In other words, the adhesive layer 190 and the barrier layer 191 can be coated and molded at one time by using the optically clear adhesive, and the thickness of the adhesive layer 190 and the barrier layer 191 would be substantially the same. In one example, the adhesive layer 190 and the barrier layer 191 can be made of different optically clear adhesive materials, and the thickness of the adhesive layer 190 and the barrier layer 191 can be the same or different.

Please refer to the following table. In this example, two optically clear adhesives are provided to make the adhesive layer 190 and the barrier layer 191.

| Characteristics of optically clear adhesive | Example 1 | Example 2 |
| --- | --- | --- |
| Thickness (μm) | 150 | 200 |
| Moisture sorption rate (%) | 0.1 | 0.2 |
| Dk | 2.56 | 2.85 |
| Water vapor permeability (g/m$^{2*}$ day) | 42 (measured at 50° C./90% condition) | 1350 (measured at 65° C./90% condition) |

In one example, the used adhesive layer 190/barrier layer 191 can have a low moisture absorption rate, for example, below 0.5%, below 0.2%, or below 0.1%.

Figure 9:
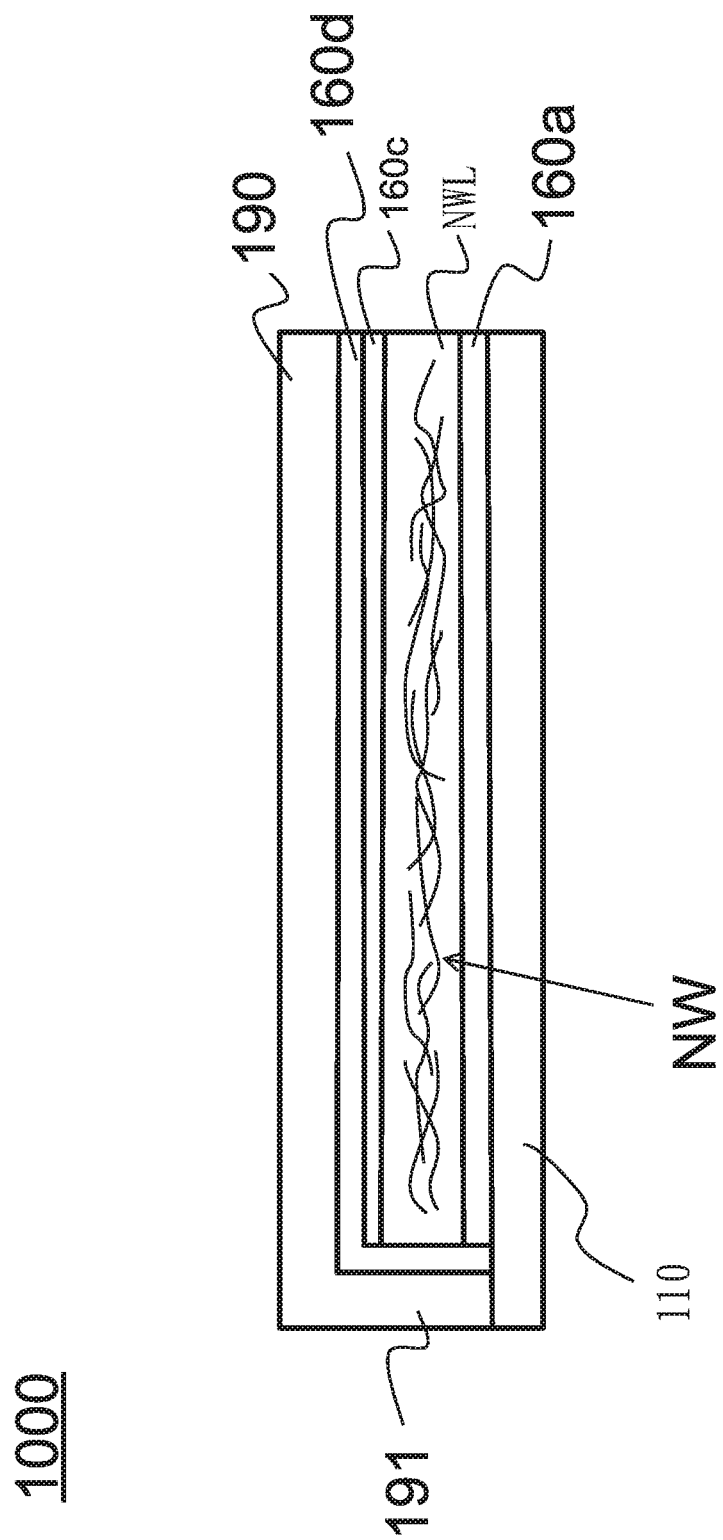
FIG. 9 is a schematic side view of a touch panel according to other embodiments of the present disclosure.

Please refer to FIG. 9. The touch panel 1000 can include a second top coating 160d. The second top coating 160d is disposed on the first top coating 160c, which also has a moisture intrusion interface. Therefore, the barrier layer 191 of the example of the present disclosure can be covered on the side (that is, the moisture intrusion interface) of the second top coating 160d to achieve the effect of slowing down the attack of water vapor/moisture on the electrode. In the present example, the second top coating 160d has an L-shaped structure, which covers the first top coating 160c and covers the side of the multiple functional layers/structure layers between the second top coating 160d and the substrate 110. In other words, the side (that is, the moisture intrusion interface) of the first top coating 160c described above would be covered by the second top coating 160d, and the barrier layer 191 would cover the side of the second top coating 160d. From the perspective of water vapor intrusion, the barrier layer 191 and the second top coating 160d are formed sequentially (from the outside to the inside). The second top coating 160d can be made of hydrophobic polymer materials with a water blocking function (for example, 100 to 500 g/m$^2$*day water permeability (measured at 65° C./90% condition)), and so the second top coating 160d can also delay the time before the electrode of the touch panel 1000 is attacked. In one example, the thickness of the second top coating 160d is about 1/10 to 1/1000 of the thickness of the adhesive layer 190. In one embodiment, the thickness of the second top coating 160d is about 1/100 to 1/500 of the thickness of the adhesive layer 190.

Figure 10A:
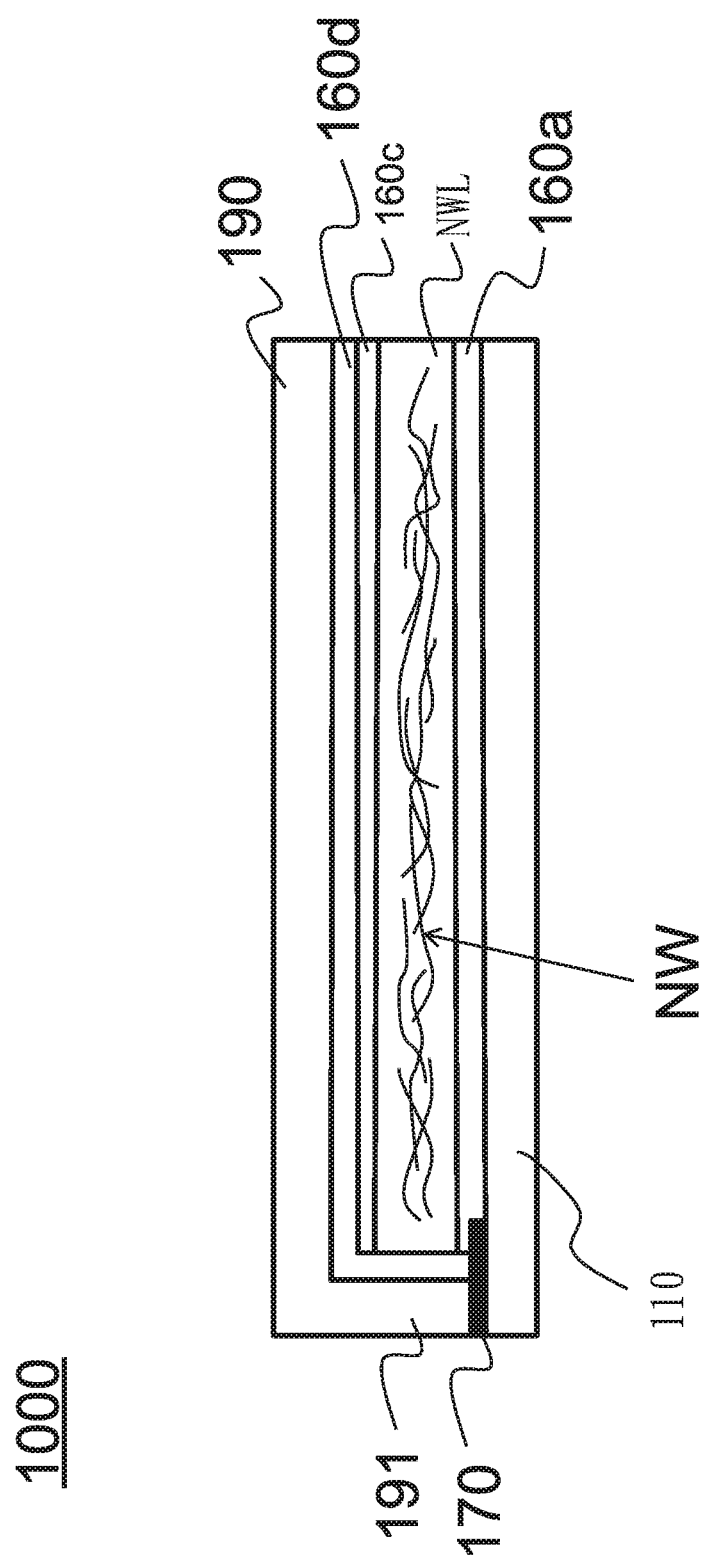
FIG. 10A is a schematic side view of a touch panel according to other embodiments of the present disclosure.
Figure 10B:
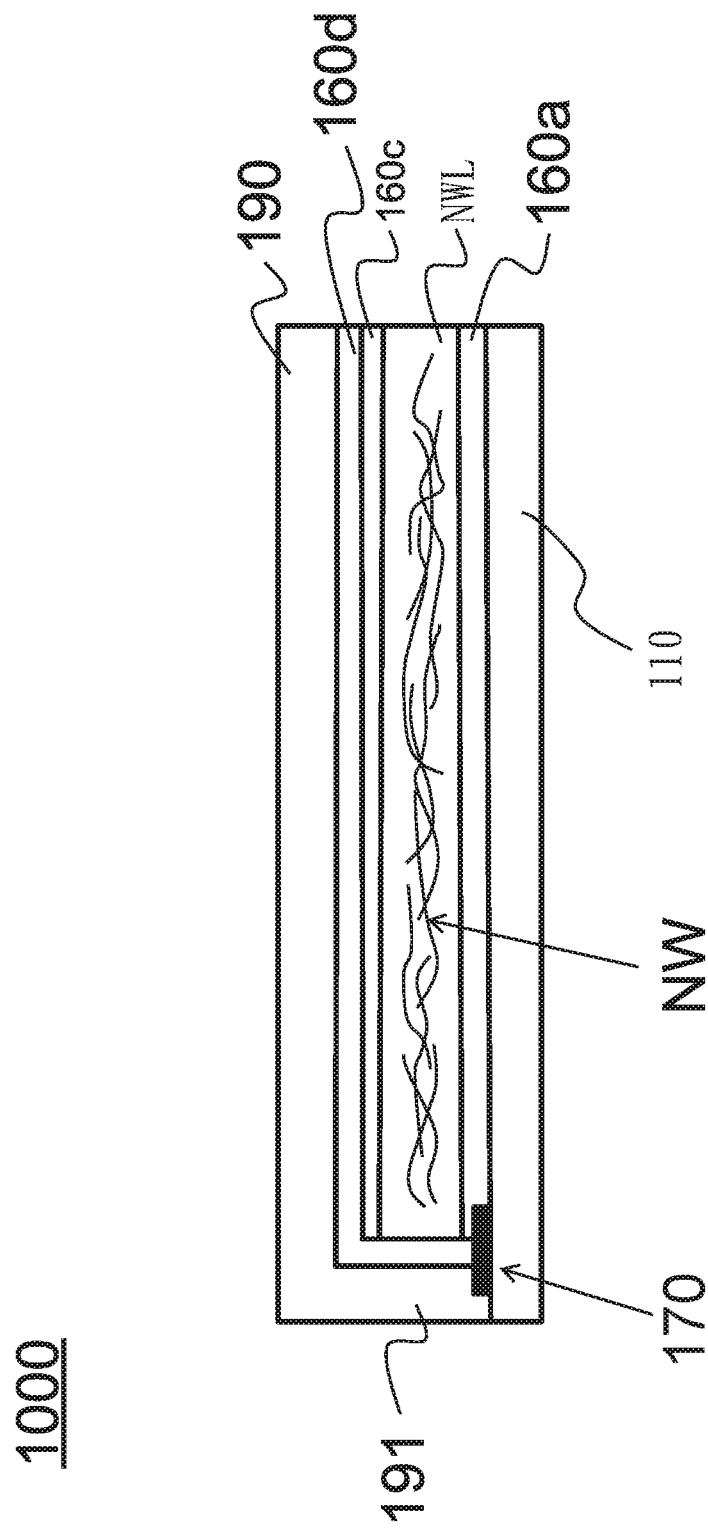
FIG. 10B is a schematic side view of a touch panel according to other embodiments of the present disclosure.

Please refer to FIGS. 10A and 10B. In one example, the substrate 110 has a light shielding layer 170 formed in the peripheral region PR. One side of the barrier layer 191 can be in contact with the side of multiple functional layers/structural layers on the substrate 110 (for example, the aforementioned moisture intrusion interface). The barrier layer 191 and the light shielding layer 170 form a front edge that is aligned with each other, and the barrier layer 191 does not in contact with the substrate 110 (as shown in FIG. 10A). Or, the barrier layer 191 can cover the side of multiple functional layers/structural layers on the substrate 110 (such as the aforementioned moisture intrusion interface) and the side of the light shielding layer 170, and the barrier layer 191 contacts the substrate 110 (FIG. 10B).

Figure 11A:
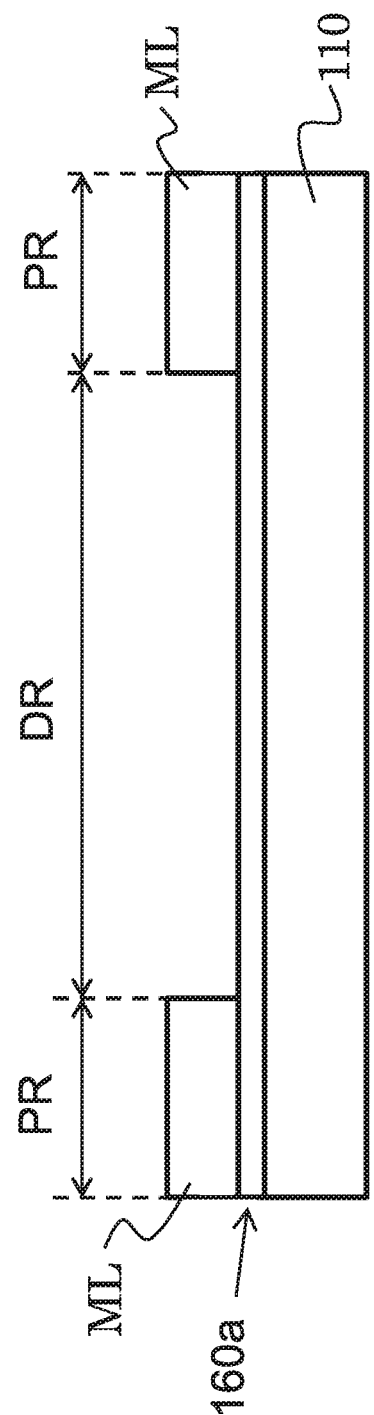
FIG. 11A to FIG. 11O are schematic views of a manufacturing method of a touch panel according to other embodiments of the present disclosure.
Figure 11B:
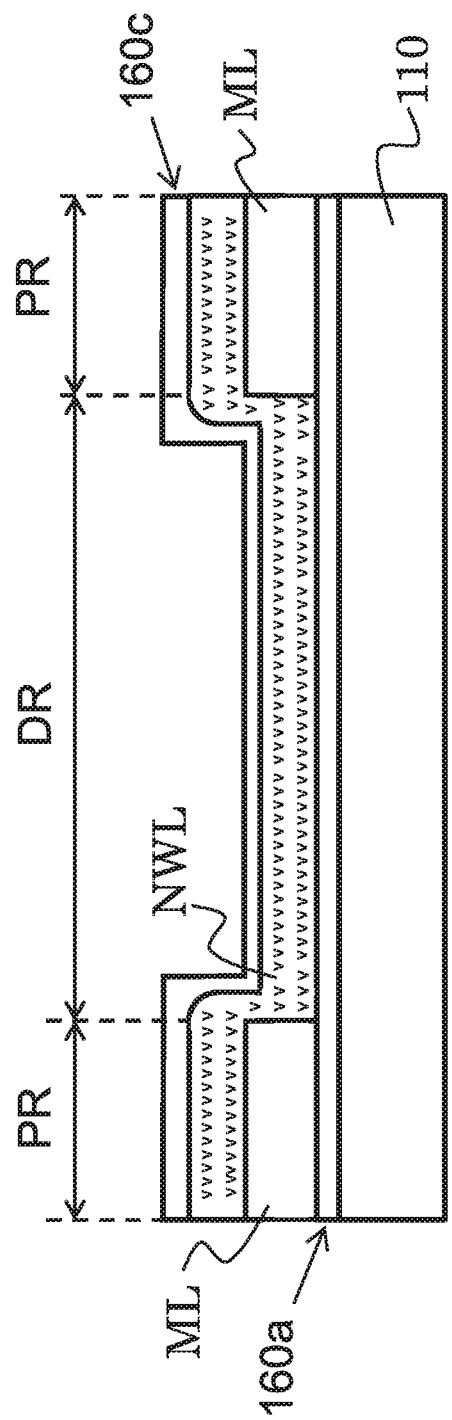
Figure 11C:
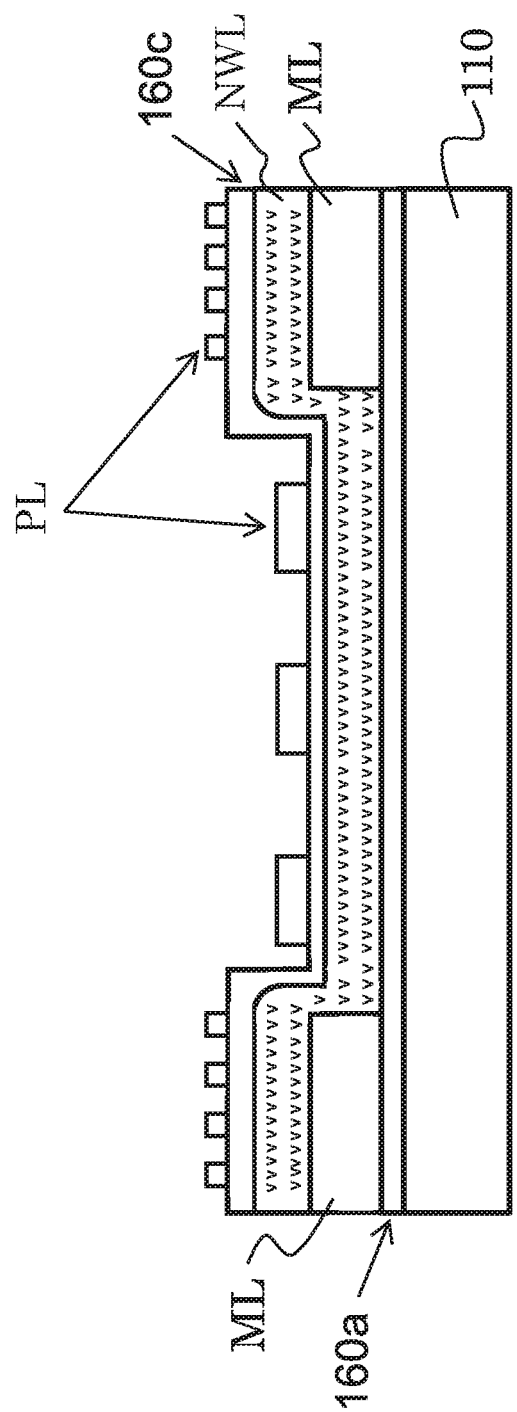

Please refer to FIGS. 11A to 11O, the touch panel 1000 in the embodiment of the present disclosure can be manufactured in the following manner. Firstly, a substrate 110 is provided, which has the pre-defined peripheral region PR and the pre-defined display region DR. Next, a metal layer ML is on the peripheral region PR (as shown in FIG. 11A); then a metal nanowire (metal nanowires) layer NWL is formed on the peripheral region PR and the display region DR (as shown in FIG. 11B); then the patterned layer PL is formed on the metal nanowire layer NWL (as shown in FIG. 11C); then patterning is performed according to the patterned layer PL to form a patterned metal layer ML and a patterned metal nanowire layer NWL. A more detailed description is given below.

Please refer to FIG. 11A. The metal layer ML is formed on the peripheral region PR of the substrate 110. The metal layer ML can be patterned to become the peripheral wire 180. In detail, in some embodiments of the present disclosure, the metal layer ML can be made of metal with better conductivity, preferably a single-layer metal structure, such as a silver layer, a copper layer, etc.; or a multi-layer conductive structure, such as molybdenum/aluminum/molybdenum, copper/nickel, titanium/aluminum/titanium, molybdenum/chromium, etc. The above-mentioned metal structure is preferably opaque, for example, the light transmittance of visible light (such as wavelength between 400 nm to 700 nm) is less than about 90%.

In this example, the aforementioned metal can be formed on the substrate 110 by a sputtering method (such as, but not limited to, a physical sputtering, a chemical sputtering, etc.) to form a metal layer ML.

In one example, the copper layer is deposited on the peripheral region PR of the substrate 110 by electroless plating. Electroless plating means that the metal ions in the plating solution are catalyzed and reduced to metal, and then plated on surfaces, in which the metal ions are catalyzed by the metal catalyst with the help of a suitable reducing agent without external current. This process is called electroless plating, or also called chemical plating or autocatalytic plating. Therefore, the metal layer ML of the embodiment can be called electroless plating, electroless plating, or autocatalytic plating. Specifically, for example, copper sulfate can be used for the main component of the plating solution. The plating solution's composition can be, but is not limited to, copper sulfate with a concentration of 5 g/L, ethylenediaminetetraacetic acid with a concentration of 12 g/L, or formaldehyde with a concentration of 5 g/L. The pH of the electroless copper plating solution is adjusted to about 11 to 13 with sodium hydroxide, the bath temperature is about 50 to 70° C., and the reaction time of immersion is about 1 to 5 minutes. In one example, a catalytic layer (not shown) can be formed on the peripheral region PR of the substrate 110 first. Since there is no catalytic layer in the display region DR, the copper layer is only deposited on the peripheral region PR and not formed on the display region DR. During the electroless plating reaction, the copper material can nucleate on the catalytic layer with catalytic/activation ability, and then the copper material continues to grow the copper film by the self-catalysis of copper.

The metal layer ML can be selectively formed in the peripheral region PR instead of the display region DR. Alternatively, the metal layer ML can be formed in the peripheral region PR and the display region DR first, and then the metal layer ML in the display region DR is removed by etching and other steps.

In one example, the bottom coating 160a can be provided on the substrate 110. The bottom coating 160a can be used to adjust the surface characteristics of the substrate 110 to facilitate the subsequent coating process of the metal nanowires NW and also to improve the adhesion between the metal nanowires NW and the substrate 110. The step of disposing the bottom coating 160a can be performed before or after the metal layer ML is manufactured.

Next, please refer to FIG. 11B. It includes at least the metal nanowire layer NWL of metal nanowires NW, such as silver nanowire(s) layer, gold nanowire(s) layer, or copper nanowire(s) layer, coated in the peripheral region PR and the display region DR. The first part of the metal nanowire layer NWL is located in the display region DR. The first part is mainly formed on the substrate 110, and the second part in the peripheral region PR is mainly formed on the metal layer ML. The specific method in the example is as follows. A dispersion or ink with metal nanowires is formed on the substrate 110 by a coating method, and the metal nanowires are dried to cover the surfaces of the substrate 110 and the aforementioned metal layer ML, thereby forming the metal nanowire layer NWL on the substrate 110 and the aforementioned metal layer ML. After the above curing/drying step, the solvent and other substances are volatilized, and the metal nanowires NW are randomly distributed on the surfaces of the substrate 110 and the aforementioned metal layer ML. Preferably, the metal nanowires NW will be fixed on the surfaces of the substrate 110 and the aforementioned metal layer ML without falling off to form the metal nanowire layer NWL. The metal nanowires NW can contact each other to provide a continuous current path, thereby forming a conductive network that makes the metal nanowire layer NWL form a conductive layer.

In the example of the present disclosure, the above-mentioned dispersion liquid can be water, alcohol, ketone, ether, hydrocarbon, or aromatic solvent (benzene, toluene, xylene, etc.). The above-mentioned dispersion liquid can also include additives, surfactants, or adhesives, such as carboxymethyl cellulose (CMC), 2-hydroxyethyl cellulose (HEC), hydroxypropyl methylcellulose (HPMC), sulfonate, and sulfate, disulfonate, sulfosuccinate, phosphate or fluorine-containing interfacial surfactant, etc. The dispersion or slurry including metal nanowires NW can be molded on the surface of substrate 110 and the aforementioned metal layer ML in any manner. For example, but not limitation, a screen printing, a nozzle coating, a roller coating, etc. In one example, a roll-to-roll (RTR) process can be used to coat the dispersion or slurry including metal nanowires on the continuously supplied substrate 110 and the surface of the aforementioned metal layer ML.

In addition, the first/second top coating 160c, 160d can be disposed on the metal nanowire layer NWL (FIG. 11B only shows the first top coating 160c). The first/second top coating 160c, 160d can form a composite structure with the metal nanowire layer NWL and has certain specific chemical, mechanical, and optical properties. For example, the adhesion or better physical-mechanical strength of the metal nanowire layer NWL and the substrate 110 is provided, so the first/second top coatings 160c, 160d can also be called a matrix layer. The composite structure can be regarded as a conductor, which can be used to make electrodes transmit electrical signals. On the other hand, some specific polymers are used to make the first/second top coatings 160c, 160d, so that the touch sensing electrode TE made of metal nanowire layer NWL or other electrodes have additional surface protection against scratches and abrasion. In this case, the first/second top coatings 160c, 160d can also be called the external coating. For example, polyacrylate, epoxy resin, polyurethane, polysilane, polysiloxane, poly(silicon-acrylic), etc. is used to make the touch sensing electrode TE have a higher surface strength to improve scratch resistance. However, the above is only to illustrate the possibility of other additional functions/names of the top coatings 160c, 160d, and is not intended to limit the present disclosure. It is worth noting that, in the drawings of the present disclosure, the first/second top coatings 160c, 160d and metal nanowire layer NWL are drawn as different layer structures, but in one example, the polymer/polymeric material used to make the first/second top coatings 160c, 160d can penetrate into metal nanowires NW to form the filler before being cured or in a pre-cured state. When the polymer is cured, the metal nanowires NW would be embedded in the first/second top coatings 160c, 160d. That is, the present disclosure does not limit the structure between the first/second top coatings 160c, 160d and the metal nanowire layer NWL (for example, the touch sensing electrode TE).

Then a patterning process is performed, as shown in FIG. 11C. A patterned layer PL can be formed on the metal nanowire layer NWL. In one example, the patterned layer PL uses flexography technology to directly form a patterned structure on the metal nanowire layer NWL. In one example, after the material to be printed is printed on the metal nanowire layer NWL, a curing step can be performed according to the characteristics of the material. In one example, the patterned layer PL uses a relief printing, a gravure printing, or a screen printing to transfer the material to be printed to the metal nanowire layer NWL according to a specific pattern. In one example, after coating the photoresist, the patterned layer PL can be formed by a photolithography process.

The patterned layer PL can be formed in the peripheral region PR according to the aforementioned method, and can also be formed in the peripheral region PR and the display region DR. The patterned layer PL (also referred to as the second patterned layer) located in the peripheral region PR is mainly used as an etching mask for the peripheral region PR in order to pattern the metal nanowire layer NWL and metal layer ML of the peripheral region PR in the following steps. The patterned layer PL (also referred to as the first patterned layer) located in the display region DR is mainly used as an etching mask for the display region DR in order to pattern the metal nanowire layer NWL of the display region DR in the following steps.

The example of the present disclosure does not limit the material of the patterned layer PL (i.e., the aforementioned material to be printed). For example, polymer materials include the following: various photoresist materials, bottom coating materials, outer coating materials, protective layer materials, insulating layer materials, etc. The polymer material can be phenolic resin, epoxy resin, acrylic resin, PU resin, ABS resin, amino resin, silicone resin, etc. In terms of material properties, the material of the patterned layer PL can be photocurable material or thermal curing material. In one example, the material of the patterned layer PL has a viscosity of about 200 to 1500 cps and a solid content of about 30 to 100 wt. %.

Figure 12:
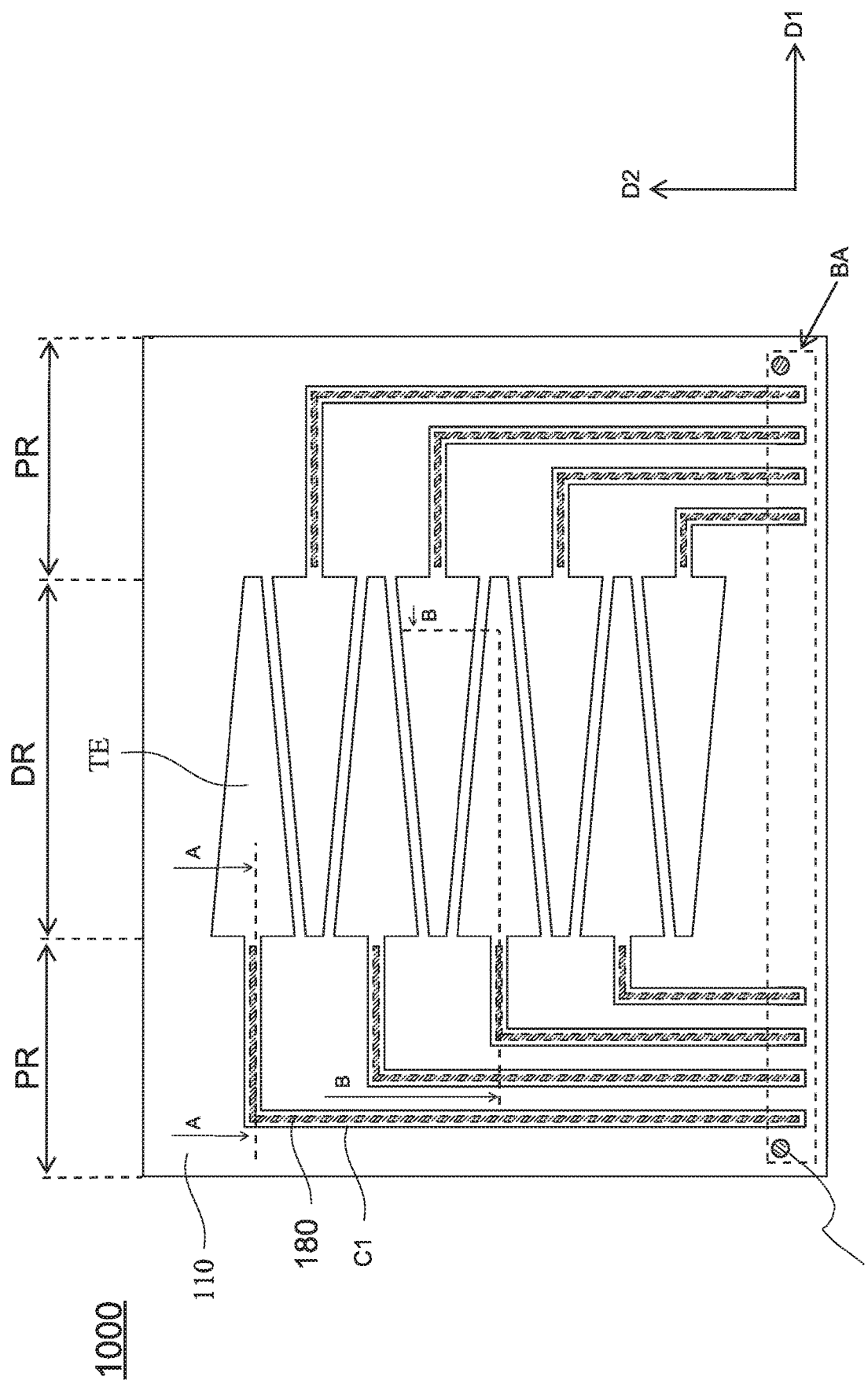
FIG. 12 is a schematic top view of a touch panel according to other embodiments of the present disclosure.
Figure 12A:
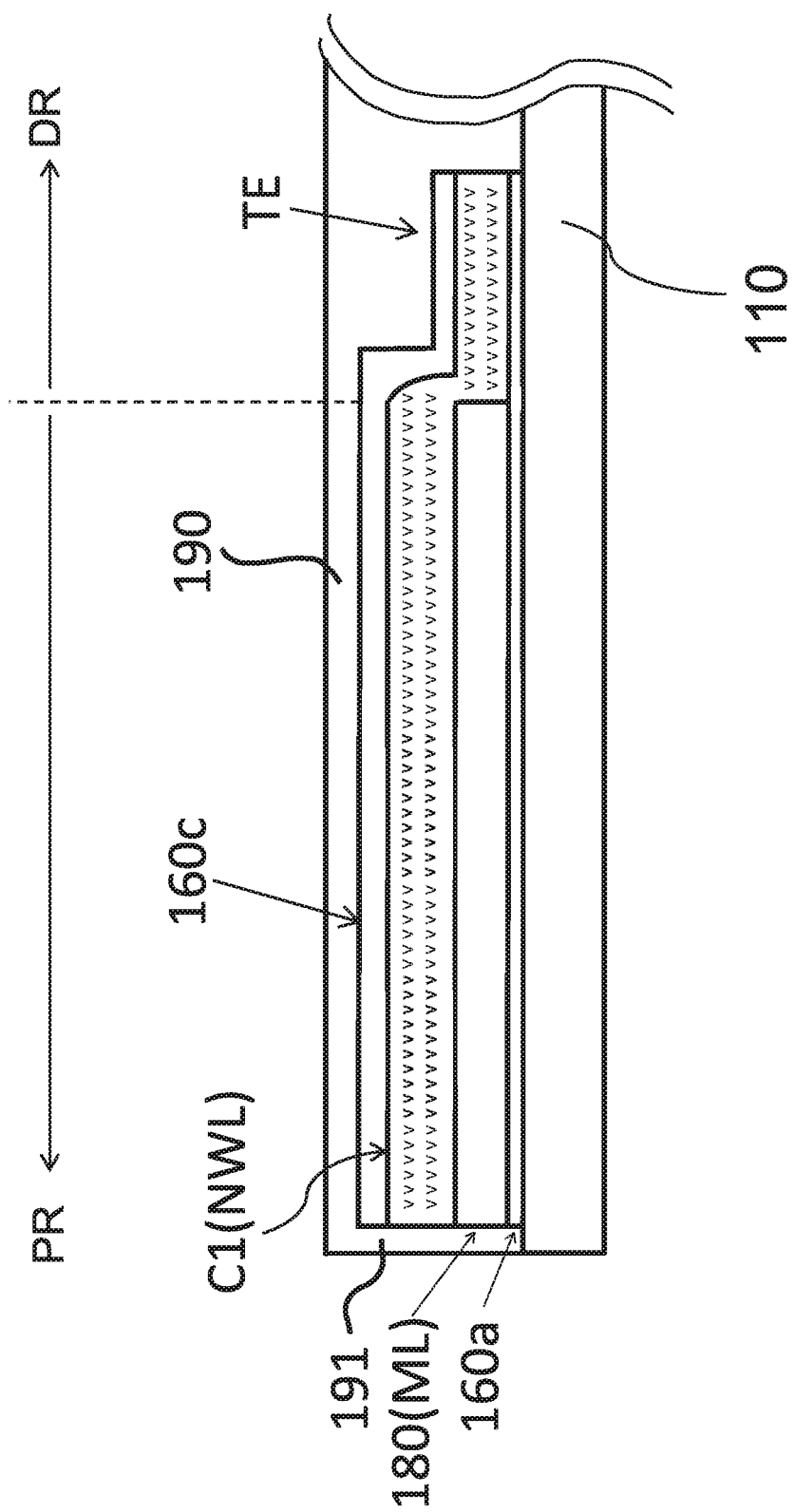
FIG. 12A is a cross-sectional view of A-A in FIG. 12.
Figure 12B:
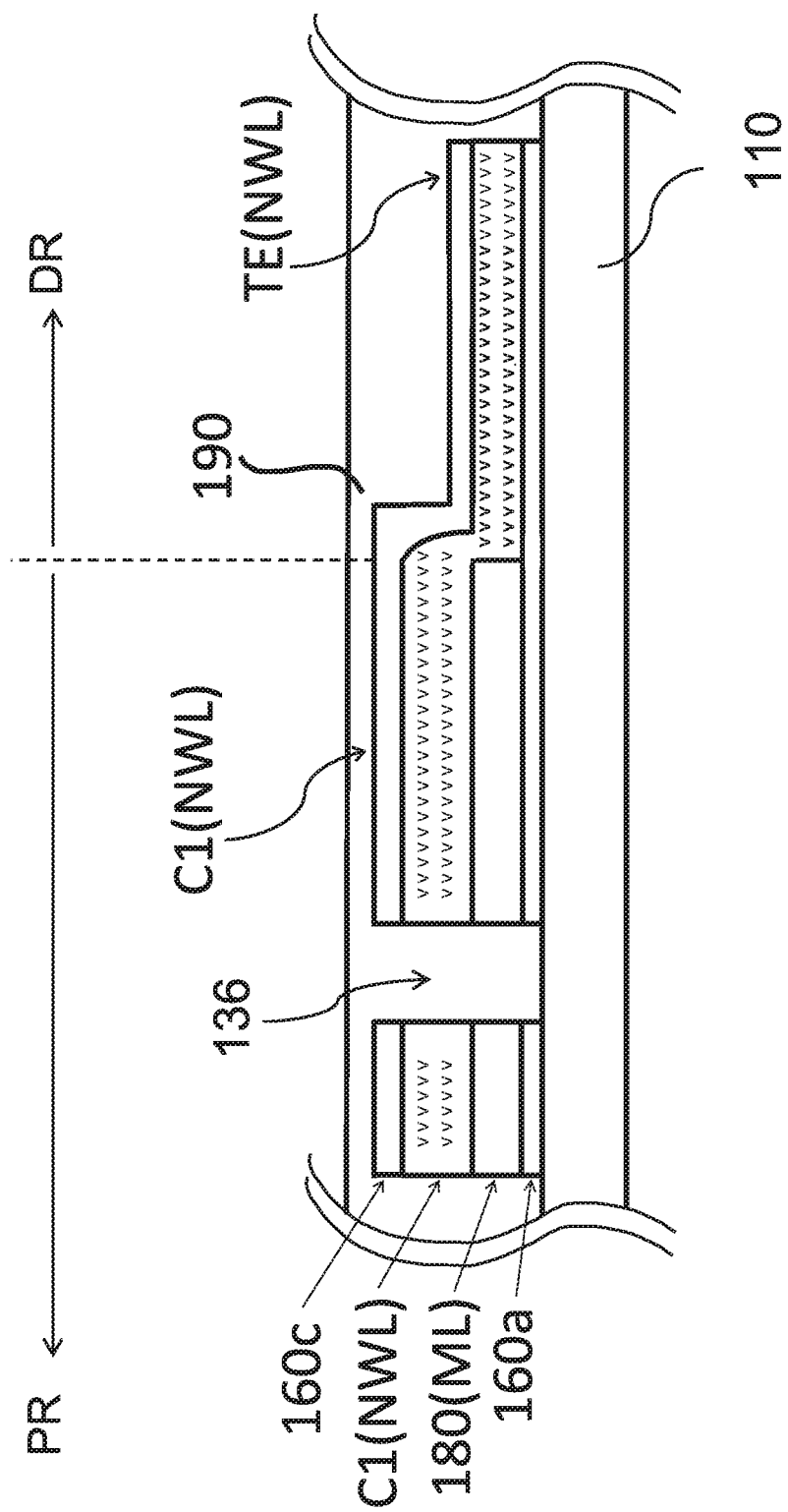
FIG. 12B is a cross-sectional view of B-B in FIG. 12.

Then, the pattern of the patterned layer PL is transferred to the aforementioned metal nanowire layer NWL, metal layer ML, bottom coating 160a, first/second top coatings 160c, 160d and other structural layers, and the barrier layer 191 is disposed to cover the side of the aforementioned structural layer. FIGS. 12 to 12B show an electrode structure manufactured by the method of the present example, for example, a sensing electrode for sensing touch signals.

In one example, the patterning includes using an etching solution that can simultaneously etch multiple functional layers/structural layers (such as the metal nanowire layer NWL and the metal layer ML) in the peripheral region PR. The etching mask formed in conjunction with the patterned layer PL (also called the second patterned layer) is used to produce the patterned metal layer ML and the patterned metal nanowire layer NWL in the same process. As shown in FIG. 12 and FIG. 12B, the patterned metal layer ML produced in the peripheral region PR is the peripheral wire 180, and the patterned metal nanowire layer NWL is the etching layer. Because the etching layer of the example is located on the peripheral wire 180, it can also be called a first covering C1. In other words, after the patterning step, the peripheral region PR has the first covering C1 formed by the second part of the metal nanowire layer NWL and the peripheral wires formed by the metal layer ML. The two layers are stacked to form a signal transmission path for the peripheral region PR. As mentioned above, the first top coating 160c can form a composite conductive layer with the metal nanowire layer NWL, and the composite conductive layer forms electrical conduction with the peripheral wire 180 formed by the metal layer ML to transmit signals. In another example, an etching layer including the second part of the metal nanowire layer NWL and the peripheral wire 180 including the metal layer ML and the mark ALM can be manufactured in the peripheral region PR (please refer to FIG. 12). The etching layer can include the first covering C1 and a second covering C2. The first covering C1 is disposed on the corresponding peripheral wire 180, and the second C2 is disposed on a corresponding mark ALM. In one example, the metal nanowire layer NWL and the metal layer ML can be etched at the same time means that the etching rate ratio of the metal nanowire layer NWL to the metal layer ML is about 0.1 to 10 or 0.01 to 100.

According to a specific example, if the metal nanowire layer NWL is a silver nanowire layer and the metal layer ML is a copper layer, the etching solution can be used to etch copper and silver. For example, the main component of the etching solution is $H_3PO_4$ (the ratio is about 55 vol. % to 70 vol. %) and $HNO_3$ (the ratio is about 5 vol. % to 15 vol. %) to remove the copper and silver materials in the same process. In another specific example, additives can be added to the main component of the etching solution, such as an etching selection ratio adjuster, to adjust the rate of etching copper and silver. For example, about 5% to 10% benzotriazole (BTA) is added to the main component of $H_3PO_4$ (the ratio is about 55 vol. % to 70 vol. %) and $HNO_3$ (the ratio is about 5 vol. % to 15 vol. %) to solve the problem of copper over-etching. In another specific example, the main component of the etching solution is ferric chloride/nitric acid or phosphoric acid/hydrogen peroxide.

In one example, the metal nanowire layer NWL located in the display region DR and the peripheral region PR can be patterned by different etching steps (that is, using different etching solutions). For example, the metal nanowire layer NWL is a nano silver layer. If the metal layer ML is a copper layer, the etching solution used in the display region DR can be an etching solution that can only etch silver. In other words, the etching rate of silver by the etching solution is about 100 times, about 1000 times, or about 10000 times greater than that of copper.

The barrier layer 191 can be coated after or before the patterning step to cover the side of the aforementioned structural layer (such as the bottom coating 160a, the first top coating 160c, the first covering C1, or the peripheral wire 180, etc.). As described above, the barrier layer 191 can slow down the attack of water vapor/moisture in the environment on the electrode. The method of disposing the barrier layer 191 can directly coat the material with lower water absorption on the side of the aforementioned structural layer. Alternatively, the optically clear adhesive (OCA) with lower water absorption can be coated on the front and side of the aforementioned structural layer to form an L-shaped structure (please refer to the cross-sectional view shown in FIG. 12A). One arm of the L-shaped structure can be used as the adhesive layer 190 to fit the display device 150 (please refer to FIG. 8), and the other arm of the L-shaped structure can be used as the barrier layer 191 to slow down the attack of water vapor/moisture in the environment on the electrode. In one embodiment, the touch panel 1000 can be assembled by using the adhesive layer 190 and an optical film, such as a polarizer, etc.

Accordingly, the touch panel 1000 as shown in FIG. 12 can be produced. To keep the diagram concise, the barrier layer 191 is not drawn in FIG. 12.

FIG. 12 shows a schematic top view of the touch panel 1000 according to an embodiment of the present disclosure. FIG. 12A and FIG. 12B are cross-sectional views taken along the lines A-A and B-B of FIG. 6, respectively. Please refer to FIG. 12A first. As shown in FIG. 12A, the peripheral wire 180 is disposed in the peripheral region PR. The first covering C1 is formed and covers the upper surface of the peripheral wire 180. The barrier layer 191 is disposed in the peripheral region PR and covers the sides of the bottom coating 160a, the first top coating 160c, the first covering C1, or the peripheral wire 180. The adhesive layer 190 covers the first top coating 160c. In some embodiments of the present disclosure, the metal nanowires NW can be silver nanowires, and the barrier layer 191 is disposed in the peripheral region PR and covers at least one side of the outermost peripheral wire 180, such as the outer side (that is, a side far from the display region DR). Specifically, the barrier layer 191 would cover the outer side (that is, the moisture intrusion interface) of the bottom coating 160a, the first top coating 160c, etc. in the outermost peripheral wire 180 to prevent water vapor/moisture from entering the touch panel 1000 along the path formed by the bottom coating 160a and the first top coating 160c.

The touch panel 1000 includes the substrate 110, the peripheral wire 180, the first covering C1, and the touch sensing electrode TE. Refer to FIG. 12, the substrate 110 has the display region DR and the peripheral region PR. The peripheral region PR is disposed on the side of the display region DR. For example, the peripheral region PR can be disposed around the display region DR (that is, covering the right, left, upper, and lower sides). But in other examples, the peripheral region PR can be an L-shaped region disposed on the left and lower sides of the display region DR. As shown in FIG. 12, the present example has a total of eight sets of peripheral wires 180 and the first covering C1 corresponding to the peripheral wires 180 are disposed in the peripheral region PR of the substrate 110. The touch sensing electrode TE is roughly disposed in the display region DR of the substrate 110.

By placing the first covering C1 on the upper surface of the peripheral wire 180, the first covering C1 and the peripheral wire 180 can be formed in a predetermined position without the need for alignment of the upper and lower layers of materials, so that alignment bit error area can be reduced or avoided in the manufacturing process. In this way, the width of the peripheral region PR can be reduced, thereby achieving the narrow bezel requirement of displays.

The touch panel 1000 further includes the mark ALM and the second covering C2. In this example, two sets of mark ALM and the second covering C2 corresponding to the mark ALM are disposed in the peripheral region PR of the substrate 110. The number of the above-mentioned peripheral wires 180, marks ALM, first coverings 01, second coverings C2, and touch sensing electrodes TE can be one or more, and the numbers drawn in the following specific embodiments and drawings are for illustrative purposes only, and not intended to limit the present disclosure.

In the present example, the mark ALM is disposed in the bonding area BA of the peripheral region PR (as shown in FIG. 12). The mark ALM is the docking bit mark, in which, in the step of connecting an external circuit board, such as the flexible circuit board to the touch panel 1000 (that is, the bonding step), the mark ALM is used to mark the position of the flexible circuit board and the touch panel 1000. The mark ALM can be produced by the metal layer ML through an etching process. In terms of structure, the mark ALM has the second covering C2 made of metal nanowires. However, the present disclosure does not limit the position or function of the mark ALM. For example, the mark ALM can be any check mark, pattern, or label required in the manufacturing process, which is within the scope of protection of the present disclosure. The mark ALM can have any possible shape, such as a circle, a quadrilateral, a cross, an L-shape, a T-shape, and so on. In some embodiments of the present disclosure, the barrier layer 191 is disposed in the peripheral region PR and covers at least one side of the mark ALM, such as the outer side (that is, a side far from the display region DR). Specifically, the barrier layer 191 can cover the outer side of the bottom coating 160a, the first top coating 160c, etc. in the mark ALM to prevent moisture vapor/moisture from intruding into the interior of the touch panel 1000 along the path formed by the bottom coating 160a, the first top coating 160c, etc.

As shown in FIG. 12B, in the peripheral region PR, there is a non-conductive area 136 between adjacent peripheral wires (that is, the combination of the peripheral wire 180 and the first covering C1) to electrically block the adjacent peripheral wires to avoid short circuits. In this example, the non-conductive area 136 is a gap to isolate adjacent peripheral wires. The aforementioned gap can be made by etching, so the side of the peripheral wire 180 and the side of the first covering C1 are a common etching surface and are aligned with each other. That is to say, using the printed side of the patterned layer PL as a reference, the side of the peripheral wire 180 and the side of the first covering C1 are formed in the same etching step according to the printed side of the patterned layer PL. Therefore the printed side and the common etching surface are aligned with each other. Similarly, the side of the mark ALM and the side of the second covering C2 are a common etching surface and are aligned with each other, and the printed side of the patterned layer PL is also aligned with the common etching surface. In one embodiment, the peripheral wire 180 and the first covering C1 would have the same or similar patterns and dimensions, such as long and straight patterns, and the same or similar width. The mark ALM and the second covering C2 also have the same or similar patterns and dimensions, such as circles with the same or similar radii, quadrilaterals with the same or similar side lengths, the same or similar crosses, L-shaped, T-shaped, and other patterns. In the present example, the non-conductive area 136 is filled with the aforementioned low water absorption material, for example, an optically clear adhesive (OCA) with low water absorption can be filled in the non-conductive area 136.

Similarly, in the display region DR, there is the non-conductive area 136 between the adjacent touch sensing electrodes TE to electrically block the adjacent touch sensing electrodes TE to avoid short circuits. In other words, there is the non-conductive area 136 between the sidewalls of the adjacent touch sensing electrodes TE. In this example, the non-conductive area 136 is a gap to isolate the adjacent touch sensing electrodes TE. In one example, the above-mentioned etching method can be used to form the gap between the adjacent touch sensing electrodes TE. In the present example, the touch sensing electrode TE and the first covering C1 can be made by using the same layer of metal nanowire layer NWL (such as a silver nanowire layer). Therefore, at the junction of the display region DR and the peripheral region PR, the metal nanowire layer NWL would form a climbing structure to facilitate the formation of the metal nanowire layer NWL and cover the upper surface of the peripheral wire 180, thereby forming the first covering C1. In one embodiment, the non-conductive area 136 includes the aforementioned gap and the non-conductive material (such as the aforementioned coating 160 material) filled therein.

In the present embodiment, the touch sensing electrode TE is disposed in a non-staggered arrangement. For example, the touch sensing electrode TE is an elongated electrode extending along the first direction D1 and having a width in the second direction D2, and the touch sensing electrodes TE do not intersect each other. However, in other embodiments, the touch sensing electrode TE can have an appropriate shape, which should not limit the scope of the present disclosure. In the present embodiment, the touch sensing electrode TE adopts a single-layer configuration, in which the touch position can be obtained by detecting the change in the capacitance value of each touch sensing electrode TE. In another embodiment, the touch sensing electrode TE is an elongated electrode extending along the first direction D1 and having the same width in the second direction D2, and the touch sensing electrodes TE do not cross each other.

In some embodiments of the present disclosure, the first covering C1 of the touch panel 1000 is disposed on the upper surface of the peripheral wire 180, and the first covering C1 and the peripheral wire 180 are formed in the same etching process. Therefore, it is possible to reduce or avoid the need for setting the alignment bit error area in the process. In this way, the width of the peripheral region PR can be reduced, thereby meeting the narrow bezel requirement of the display. Specifically, in some embodiments of the present disclosure, the width of the peripheral wire 180 of the touch panel 1000 is about 5 µm to 30 µm, and the distance between the adjacent peripheral wires 180 is about 5 µm to 30 µm. Or, the width of the peripheral wire 180 of the touch panel 1000 is about 3 µm to 20 µm, and the distance between the adjacent peripheral wires 180 is about 3 µm to 20 µm. The width of the peripheral region PR can also reach a size of less than 2 mm, in which the border size is reduced by about 20% or more compared to traditional touch panel products.

In some embodiments of the present disclosure, the touch panel 1000 further has the second covering C2 and the mark ALM. The second covering C2 is disposed on the upper surface of the mark ALM, and the second covering C2 and mark ALM are formed in the same etching process.

Figure 13:
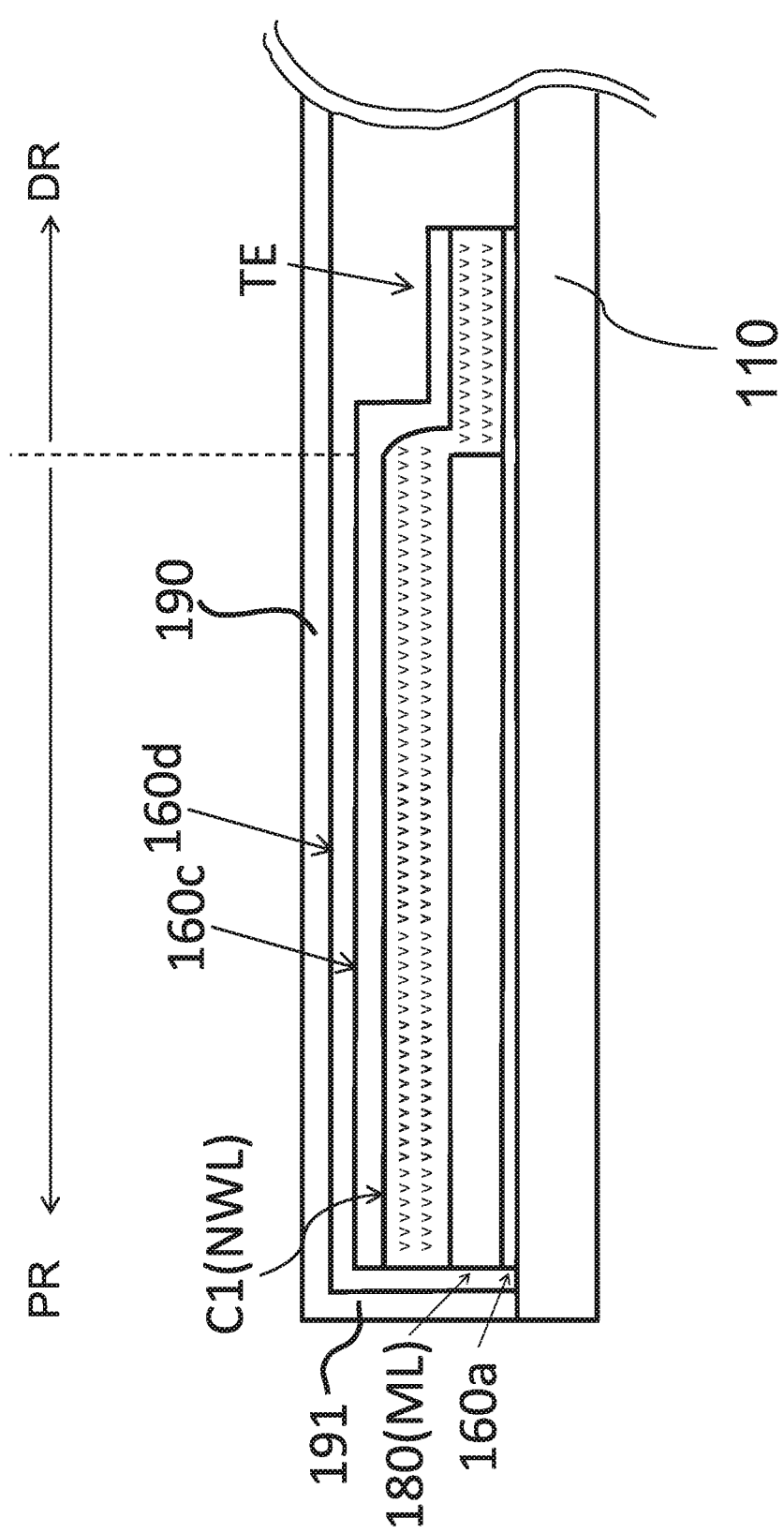
FIG. 13 is a schematic side view of a touch panel according to other embodiments of the present disclosure.

FIG. 13 shows another embodiment of the touch panel 1000 of the present disclosure. Compared with FIG. 12A, the present embodiment includes at least the second top coating 160*d*, and the second top coating 160*d* is disposed on the first top coating 160*c*. For the description of the second top coating 160*d*, please refer to the foregoing content, which will not be repeated here.

Figure 14:
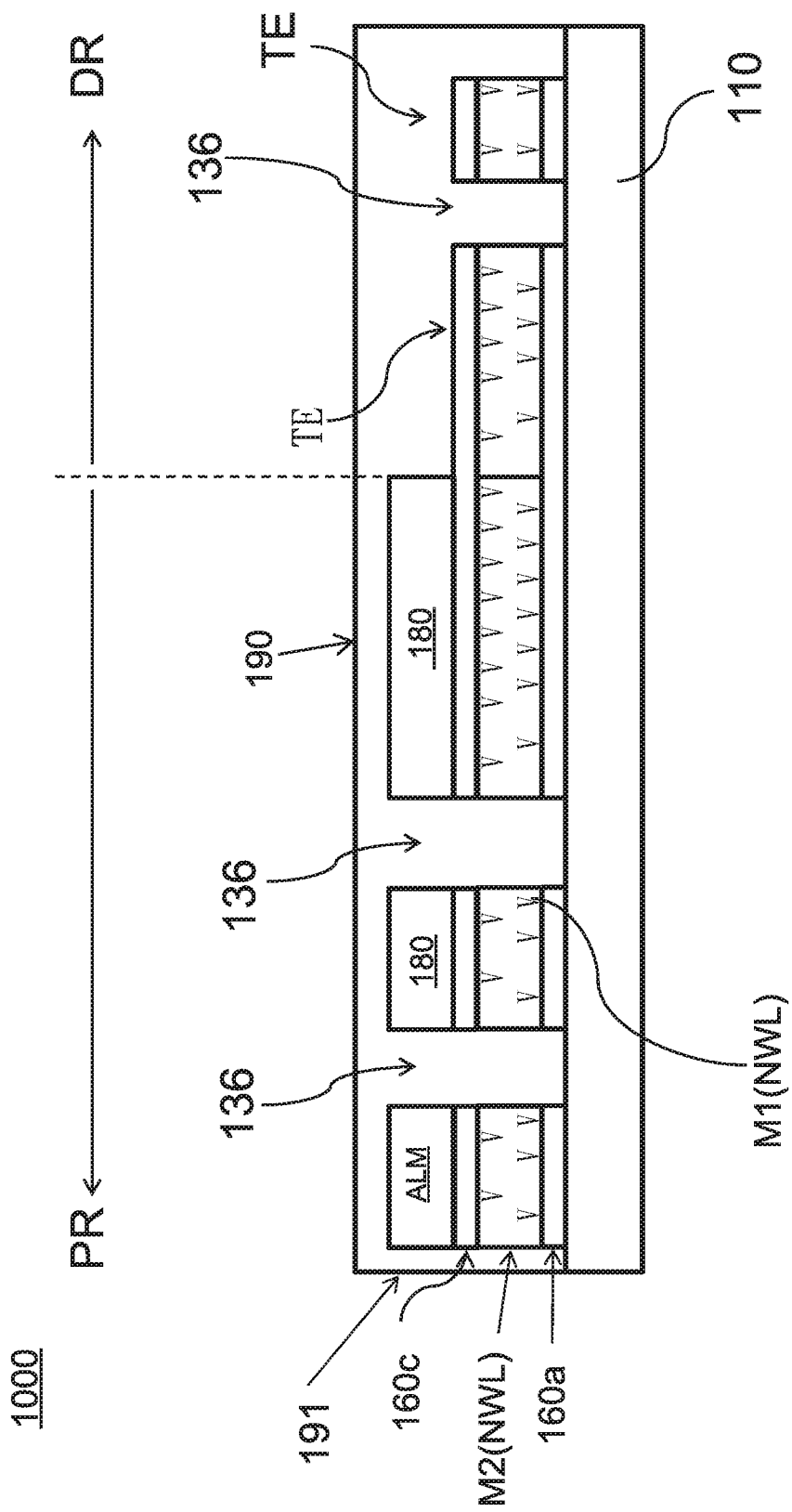
FIG. 14 is a schematic side view of a touch panel according to other embodiments of the present disclosure.

The touch panel in another embodiment of the present disclosure can be manufactured in the following manner. First, the substrate 110 is provided, which has the predefined peripheral region PR and the predefined display region DR. Next, the metal nanowire layer NWL is formed on the peripheral region PR and the display region DR. Then a metal layer ML is formed on the peripheral region PR. Then a patterned layer PL is formed on the metal nanowire layer NWL. Then, patterning is performed according to the patterned layer PL to form the patterned metal layer ML and the metal nanowire layer NWL, and the barrier layer 191 is disposed to cover the side of the aforementioned structure layer. The difference between the present example and the previous example is at least in the forming sequence of the metal layer ML and the metal nanowire layer NWL. In other words, this example firstly produces the metal nanowire layer NWL, and then produces the metal layer ML. As such, the peripheral wire 180/mark ALM is formed on the metal nanowire NW. The metal nanowire layer NWL is patterned to form a second interlayer M2/first interlayer M1 (as shown in FIG. 14). For the specific details of this step and other related descriptions, for example, the steps of forming the barrier layer 191, please refer to the foregoing content.

Please refer to FIG. 14, which shows the touch panel 1000 completed in the above examples. The barrier layer 191 is disposed on the moisture intrusion interface (that is, the side of the first top coating 160*c*/bottom coating 160*a*/second top coating 160*d* (not shown)). The barrier layer 191 can avoid the exposure of the moisture intrusion interface and achieve the effect of extending the path of moisture intrusion. Therefore, the purpose of protecting the touch panel 1000, especially to slow down the water vapor/moisture from attacking the electrode, can be achieved. The detailed description of the structure of this example can refer to the foregoing content.

Figure 15:
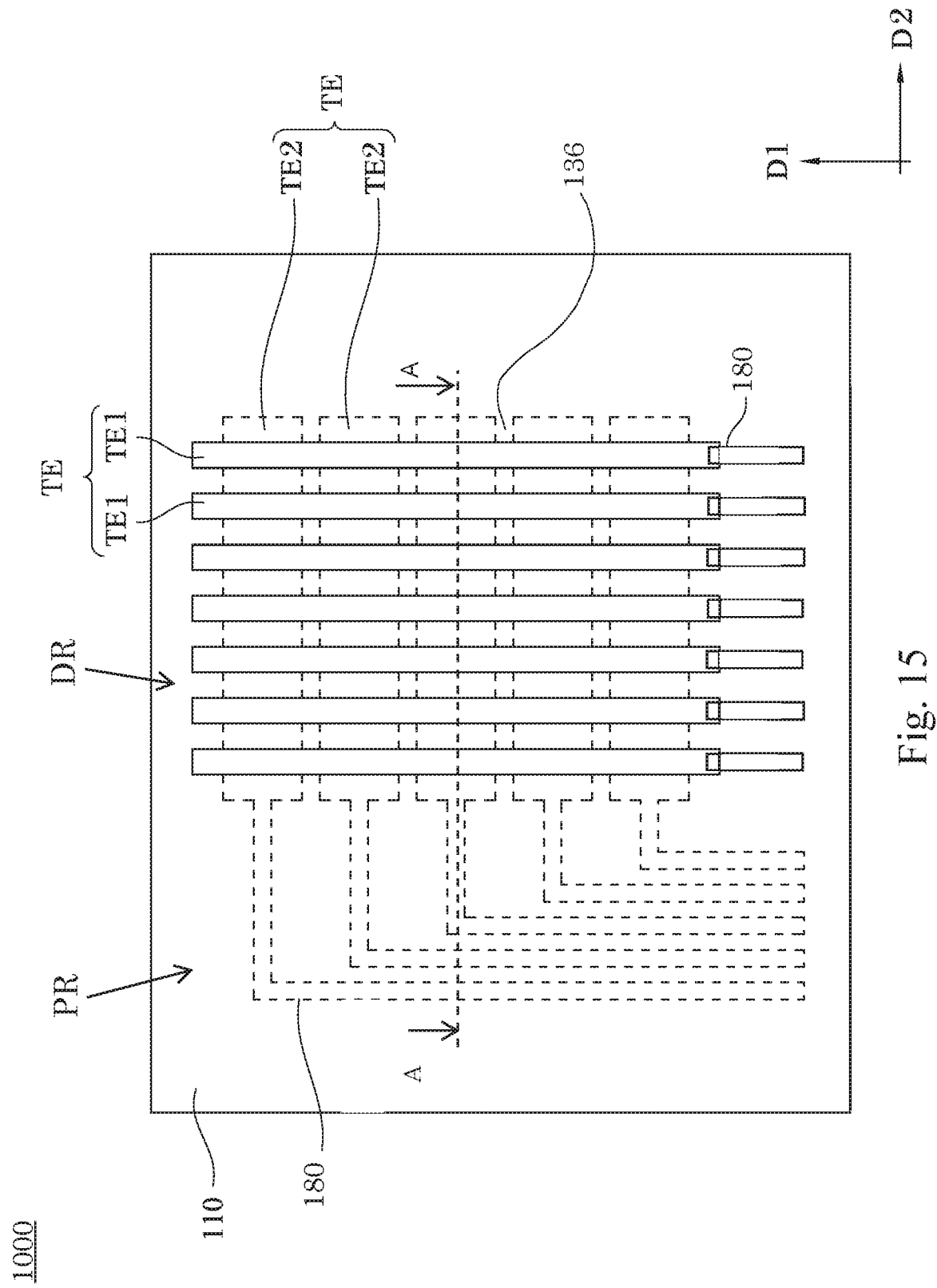
FIG. 15 is a schematic top view of a touch panel according to other embodiments of the present disclosure.

The present disclosure can also apply the above method to the double-sided substrate 110 to produce a double-sided touch panel 1000 (as shown in FIG. 15). For example, the double-sided touch panel 1000 can be produced in the following manner. First, the substrate 110 is provided, which has the predefined peripheral region PR and the predefined display region DR. Next, the metal layers ML is formed on the opposite first and second surfaces of the substrate 110 (such as the upper surface and the lower surface), and the metal layers ML is located in the peripheral region PR. Then, the metal nanowire layers NWL are formed in the peripheral regions PR of the first and second surfaces and display region DR, respectively. Then, the patterned layers PL are formed on metal nanowire layer NWL of the first and second surfaces, respectively. Then, the first and second surfaces are patterned according to the patterned layer PL to form the touch sensing electrode TE and the peripheral wire 180 on the first and second surfaces, respectively, and the first covering C1 would cover the peripheral wire 180. Then, the barrier layer 191 is disposed to cover the side of the aforementioned structural layer. In this step, the patterned layer PL can be formed by using a flexographic printing process to form the patterned layers PL on the metal nanowire layer NWL of the first and second surfaces, respectively. Since the present example does not need to go through the photolithography process (exposure and development, etc.), there is no problem of mutual influence/ interference between the double-sided process, which is beneficial to simplify the process and improve the yield. For the specific embodiment of this example, for example, the step of setting the first top coating 160*c*/bottom coating 160*a*/second top coating 160*d*, please refer to the foregoing content, which will not be repeated herein. In one example, the photolithography process (exposure and development, etc.) can also be used with a light-shielding layer (not shown) to prevent the mutual influence/interference of the double-sided photolithography process.

FIG. 15 is the double-sided touch panel 1000 according to the example of the present disclosure. It includes the substrate 110 and the touch sensing electrode TE formed on the upper and lower surfaces of the substrate 110 (that is, the first touch sensing electrode TE1 and second touch sensing electrode TE2 formed by the metal nanowire layer NWL) and the peripheral wire 180 formed on the upper and lower surfaces of the substrate 110. For the sake of simplicity, the barrier layer 191, the first top coating 160*c*, the bottom coating 160*a*, etc. are not shown in FIG. 15. Viewing from the upper surface of the substrate 110, the first touch sensing electrode TE1 of the display region DR and the peripheral wire 180 of the peripheral region PR are electrically connected to each other to transmit signals. Similarly, viewing from the lower surface of the substrate 110, the second touch sensing electrode TE2 of the display region DR and the peripheral wire 180 of the peripheral region PR are electrically connected to each other to transmit signals. In addition, as in the previous embodiment, the barrier layer 191 is disposed in the peripheral region PR and covers at least one side of the outermost peripheral wire 180, such as the outer side (that is, a side far from the display region DR). Specifically, the barrier layer 191 covers the bottom coating 160*a*, the first top coating 160*c*, etc. in the outermost peripheral wire 180 to prevent water vapor/moisture from invading inside the touch panel 1000 along the path formed by the bottom coating 160*a* and the first top coating 160*c*/ second top coating 160*d*. Please refer to the previous content for details.

Please refer to FIG. 15, the first touch sensing electrode TE1 is roughly located in the display region DR, which can include a plurality of long and straight sensing electrodes extending in the same direction (such as the first direction D1), and the etching removal area can be defined as the non-conductive area 136, which electrically blocks adjacent sensing electrodes. Similarly, the second touch sensing electrode TE2 is roughly located in the display region DR, which can include a number of long and straight sensing electrodes extending in the same direction (such as the second direction D2), and the etching removal area can be defined as the non-conductive area 136, which electrically blocks adjacent sensing electrodes. The first touch sensing electrode TE1 and the second touch sensing electrode TE2 are interlaced in the structure, and the first touch sensing electrode TE1 and the second touch sensing electrode TE2 can form the touch sensing electrode TE. The first touch sensing electrode TE1 and the second touch sensing electrode TE2 can be used to transmit control signals and receive touch sensing signals, respectively. As such, the touch position can be obtained by detecting the signal change (for example, capacitance change) between the first touch sensing electrode TE1 and the second touch sensing electrode TE2. With this configuration, the user can perform touch sensing at each point on the substrate 110.

In one example, the optically clear adhesive (OCA) can be coated on the upper or lower surface of the substrate 110 to form the aforementioned barrier layer 191 and the adhesive layer 190. The touch panel 1000 can be assembled by using the adhesive layer 190 and the display device 150 to form a display with touch function. In one embodiment, the optically clear adhesive (OCA) can be coated on the upper or lower surface of the substrate 110 to form the aforementioned barrier layer 191 and the adhesive layer 190, and the touch panel 1000 can be bonded assembly by the adhesive layer 190 and the polarizing plate.

In one example, the first optically clear adhesive (OCA) can be coated on the upper surface of the substrate 110 to form the barrier layer 191 and the first adhesive layer, and the touch panel 1000 can be assembled by using the first adhesive layer and the display device 150 to form a display with touch function (i.e., touch display module). The barrier layer 191 is disposed in the peripheral region PR and covers at least one side of the outermost peripheral wire 180 on the upper surface of the substrate 110, such as the outer side (i.e., a side far from the display region DR). Specifically, the barrier layer 191 would cover the bottom coating 160a, the first top coating 160c/second top coating 160d, etc. of the outermost peripheral wire 180 to prevent water vapor/moisture from invading the first touch sensing electrode TE1 along the path formed by the bottom coating 160a and the first top coating 160c/second top coating 160d. Please refer to the previous content for details. Similarly, the second optically clear adhesive (OCA) can be coated on the lower surface of the substrate 110 to form a second barrier layer and a second adhesive layer. The touch panel 1000 can be assembled by using the second adhesive layer and an outer cover or a polarizing plate, etc. The second barrier layer is disposed on the peripheral region PR and covers at least one side of the outermost peripheral wire 180 on the bottom surface of the substrate 110, such as the outer side (i.e., a side far from the display region DR). Specifically, the second barrier layer would cover the outer side of the bottom coating 160a, the first top coating 160c/second top coating 160d, etc. in the outermost peripheral wire 180 to prevent water vapor/moisture from invading the second touch sensing electrode TE2 along the path formed by the bottom coating 160a, the first top coating 160c/second top coating 160d, etc.

The double-sided touch panel 1000 in the embodiment of the present disclosure can also be manufactured in the following manner. First, the substrate 110 is provided, which has the predefined peripheral region PR and the predefined display region DR. Next, the metal nanowire layer NWL is formed on the opposite first and second surfaces of the substrate 110 (such as the upper surface and the lower surface) in the peripheral region PR and the display region DR of the first and second surfaces, respectively. Then, the metal layer ML is formed, and the metal layer ML is located in the peripheral region PR. Then, the patterned layer PL is formed on the metal nanowire layer NWL and metal layer ML on the first and second surfaces, respectively. Then, the first and second surfaces are patterned according to the patterned layer PL to form the first touch electrode TE1, the second touch electrode TE2, and the peripheral wire 180 on the first and second surfaces, and the peripheral wire 180 would cover the first interlayer M1. The embodiment of the present disclosure can further include steps of setting the first top coating 160c/bottom coating 160a/second top coating 160d, etc. Please refer to the foregoing content for details, which will not be repeated herein.

Similar to the foregoing example, any surface (such as the upper surface or the lower surface) of the substrate 110 can further include the mark ALM and the second interlayer M2/second covering layer C2. The side of the mark ALM can also be covered by the barrier layer 191 to prevent water vapor/moisture from invading the touch panel 1000 along the path formed by the bottom coating 160a, the first top coating 160c, and the second top coating 160d.

Figure 16:
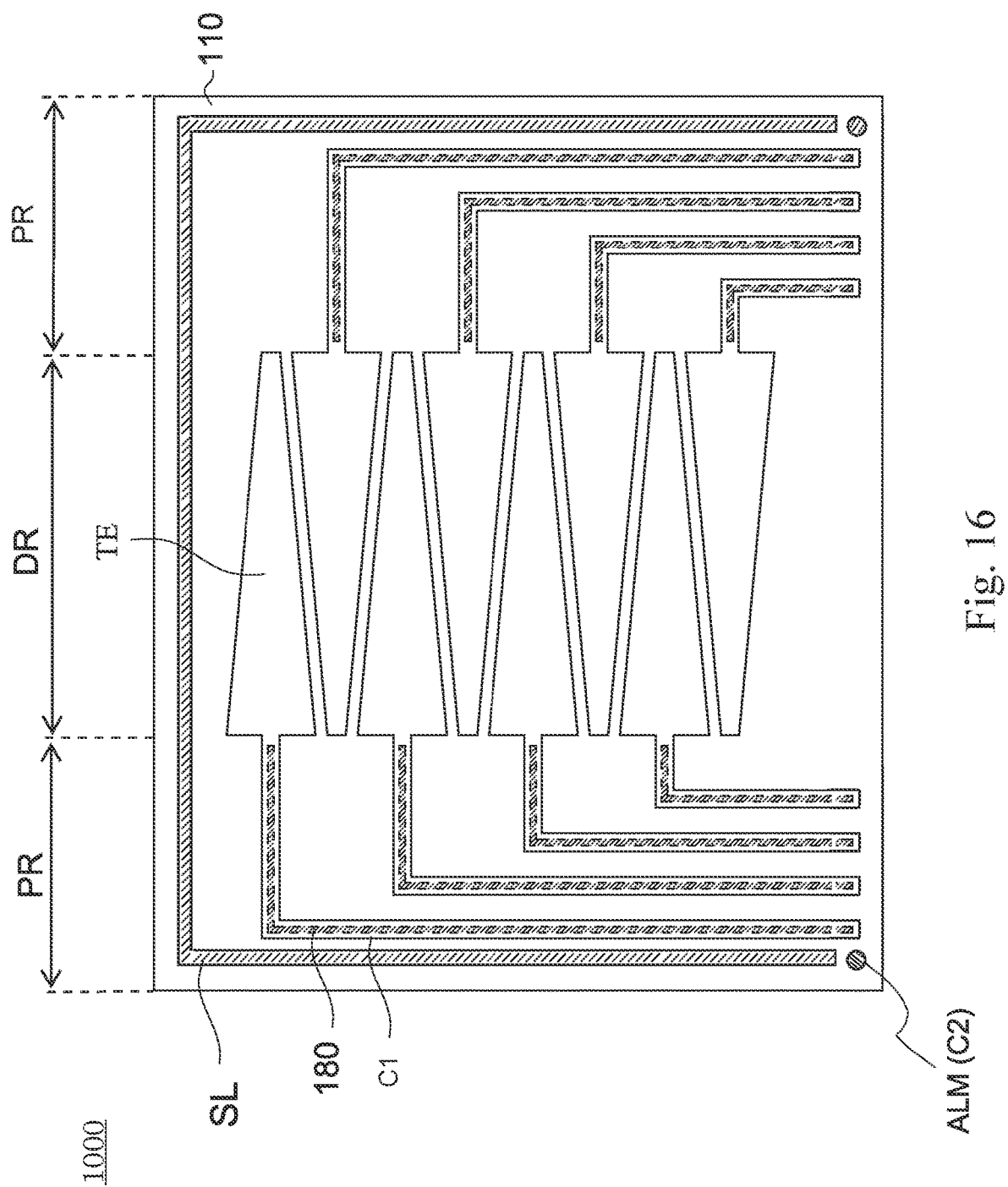
FIG. 16 is a schematic top view of a touch panel according to other embodiments of the present disclosure.

FIG. 16 is a schematic top view of a touch panel 1000 according to some embodiments of the present disclosure. This embodiment is similar to the previous embodiments. The main difference is described in the following. In this embodiment, the touch panel 1000 further includes a shielding lead SL disposed in the peripheral region PR. The shielding lead SL mainly surrounds the touch sensing electrode TE and the peripheral wire 180. The shielding lead SL extends to the bonding area BA and is electrically connected to the ground terminal of the flexible circuit board, so the shielding lead SL can shield or eliminate signal interference or can provide electrostatic discharge (ESD) protection, especially for small current changes caused by human hands touching the connecting wires around the touch device. For the sake of simplicity, FIG. 16 does not show the barrier layer 191, the first top coating 160c, the bottom coating 160a, and so on.

According to the aforementioned manufacturing method, the shielding lead SL and the peripheral wire 180 can be made of the same layer of metal layer ML (that is, both are made of the same metal material, such as the aforementioned electroless copper layer), on which the metal nanowire layer NWL is stacked (or the third covering layer); or the shielding lead SL is on the metal nanowire layer NWL (or the third intermediate layer). In addition, the shielding lead SL is closer to the external environment than the peripheral wire 180, so a side of the shielding lead SL can be covered by the barrier layer 191 to prevent water vapor/moisture from invading the touch panel 1000 along the path formed by the bottom coating 160a, the first top coating 160c, and the second top coating 160d in shielding lead SL. In this example, the side of the peripheral wire 180 can have the barrier layer 191 or no barrier layer 191.

Figure 17:
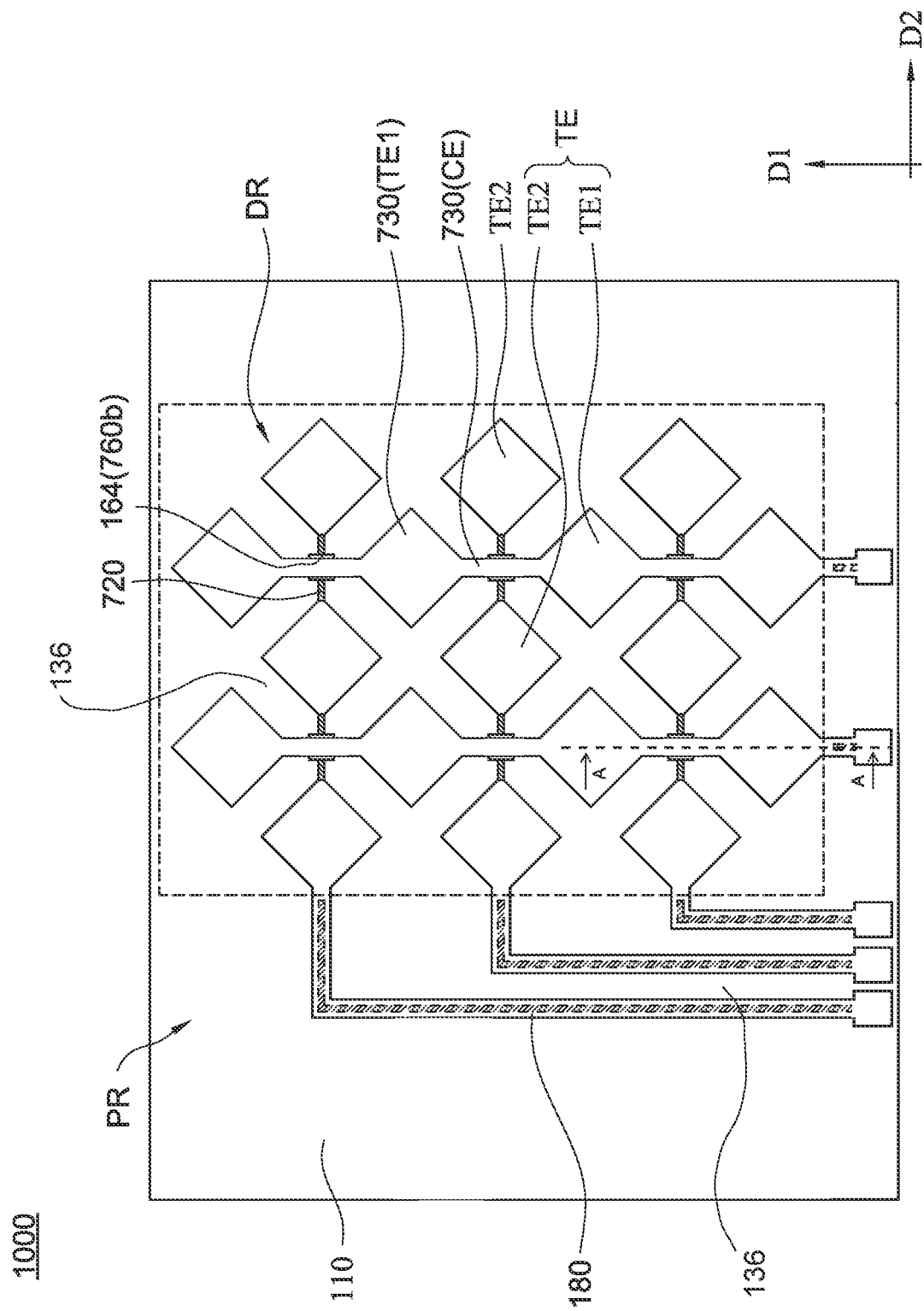
FIG. 17 is a schematic top view of a touch panel according to other embodiments of the present disclosure.

FIG. 17 shows another embodiment of the single-sided touch panel 1000 of the present disclosure, which is a single-sided bridge touch panel. The difference between this example and the above examples is at least the following. The transparent conductive layer (i.e., the metal nanowire layer NWL) formed on the substrate 110 forms the touch sensing electrode TE after the above patterning step. The touch sensing electrode TE can include the first touch sensing electrode TE1 arranged along the first direction D1, the second touch sensing electrode TE2 arranged along the second direction D2, and the connecting electrode CE electrically connecting two adjacent first touch sensing electrodes TE1. In other words, the first touch sensing electrode TE1, the second touch sensing electrode TE2, and the connecting electrode CE are made of metal nanowires. In addition, an insulating block 164 (for example, a middle coating 760b) can be disposed on the connecting electrode CE, for example, the insulating block 164 is formed of silicon dioxide. The bridging wire 720 is then disposed on the insulating block 164. For example, the bridging wire 720 is formed of copper, ITO, metal nanowires, or other materials, and the bridging wire 720 is connected to two adjacent second touch sensing electrodes TE2 in the second direction D2. The insulating block 164 is located between the connecting electrode CE and the bridging wire 720 to electrically isolate the connecting electrode CE and the bridging wire 720, so that the first touch sensing electrodes TE1 in the first direction D1 and the second touch sensing electrode TE2 in the second direction D2 are electrically isolated from each other.

Alternatively, the example of the single-sided bridge touch panel 1000 of the present disclosure can be fabricated in the following manner. The bridging wire 720 is formed on the substrate 110. The insulating block 164 is formed on the bridging wire 720. The transparent conductive layer (i.e., the metal nanowire layer NWL) formed on the substrate 110 forms the touch sensing electrode TE after the abovementioned patterning step. The touch sensing electrode TE can include the first touch sensing electrode TE1 arranged along the first direction D1, the second touch sensing electrode TE2 arranged along the second direction D2, and the connecting electrode CE that electrically connects two adjacent first touch sensing electrodes TE1. The connecting electrode CE corresponds to the insulating block 164.

Figure 17A:
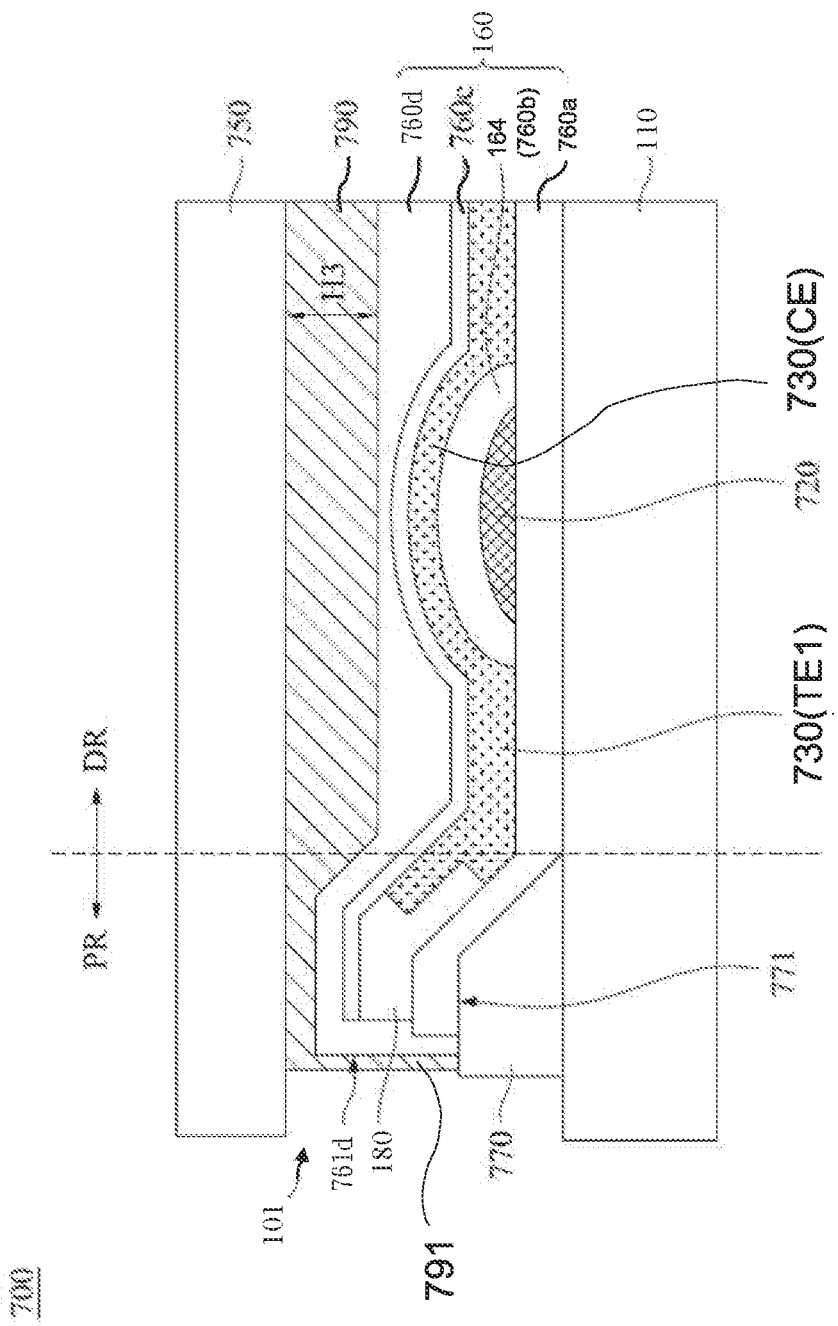
FIG. 17A is a cross-sectional view of A-A in FIG. 17.

In FIG. 17A, it can be seen that the optically clear adhesive (OCA) constitutes the structure where a barrier layer 791 covers the side of each structural layer, so the effect is the same as the aforementioned description. For the specific embodiment of the present example, for example, the steps of setting the first top coating 760c/bottom coating 760a/second top coating 760d can refer to the foregoing content, and will not be repeated herein. In addition, referring to the previous content, the optically clear adhesive (OCA) is formed on the upper surface of the substrate 110, and then the aforementioned barrier layer 791 and the aforementioned adhesive layer 790 are formed. The touch panel 1000 can be assembled with an adhesive layer 790 and other optical films, such as the display device 750 or a polarizer. The barrier layer 791 is disposed in the peripheral region PR and covers the outer side of the bottom coating 760a, the first top coating 760c, etc. in the outermost peripheral wire 180 of the substrate 110 to prevent water vapor/moisture from entering the electrode along the path formed by the bottom coating 760a and the first top coating 760c.

Please refer to FIG. 17A, which is a schematic side view of a touch display module 700 according to an embodiment of the present disclosure. At least one difference between the touch display module 700 in FIG. 17A and the touch display module 100 in FIG. 1 is described in the following. The touch display module 700 in FIG. 17A does not have a moisture barrier layer 140, and the adhesive layer 790 formed by the optically clear adhesive directly extends laterally on the topmost second top coating 760d and covers the topmost second top coating 760d. In addition, the adhesive layer 790 can further extend along a sidewall 761d of the topmost second top coating 760d to an inner surface 771 of the light shielding layer 770, to form the barrier layer 791 to cover a sidewall 761c of the topmost second top coating 760d. Specifically, it is possible to adjust the dielectric constant value, saturated water absorption, and/or water vapor permeability of the adhesive layer 790/barrier layer 791 (i.e., the optically clear adhesive) of the present disclosure and/or the structural characteristics (such as thickness H3) of the adhesive layer 790/barrier layer 791 to achieve the above effects. In the following description, a more detailed description will be given.

In some embodiments, the adhesive layer 790 can include an insulating adhesive material such as rubber, acrylic, or polyester. In some embodiments, the dielectric constant value of the adhesive layer 790 can be between 2.0 and 5.0. In some embodiments, the dielectric constant value of the adhesive layer 790 can be between 2.24 and 4.30. Because the metal ions (for example, silver ions) generated by the metal nanowires NW in the second conductive layer 730 (for example, the first touch sensing electrode TE1 or the connecting electrode CE) migrate into the adhesive layer 790, the dielectric constant value of the adhesive layer 790 can affect the migration rate of the metal ions. Therefore, by choosing a material with a dielectric constant value between 2.24 and 4.30 to make the adhesive layer 790, the mobility of metal ions in the adhesive layer 790 can be reduced, thereby reducing the possibility of electromigration of the metal nanowires NW. In detail, if the dielectric constant value of the adhesive layer 790 is less than 2.24, the metal nanowires NW may have a greater tendency to migrate to the adhesive layer 790, which greatly increases the possibility of electromigration of the metal nanowires NW.

In some embodiments, the saturated water absorption of the optically clear adhesive (i.e., the adhesive layer 790/barrier layer 791) can be between 0.08 wt. % and 0.40 wt. %. The saturated water absorption of the adhesive layer 790 can affect the rate at which the adhesive layer 790 absorbs the moisture in the environment. Therefore, by choosing a material with saturated water absorption between 0.08 wt. % and 0.40 wt. % to make the adhesive layer 790, the rate at which the water vapor in the environment enters the adhesive layer 790 can be effectively reduced to avoid or slow down the water vapor in the environment from invading and attacking the electrode, thereby reducing the possibility of electromigration of metal nanowires NW. In detail, if the saturated water absorption of the adhesive layer 790 is greater than 0.40 wt. %, it may cause the optically clear adhesive (i.e., the adhesive layer 790/barrier layer 791) to absorb too much moisture in the environment. This makes the metal nanowires to be in a state which tends to result in electromigration, resulting in failure of the component. In some embodiments, the saturated water absorption of the adhesive layer 790 can be measured by, for example, immersing the dried adhesive layer 790 in water after weighing and taking out the adhesive layer 790 for weighing every 24 hours. The above steps can be repeated until the weight of the adhesive layer 190 does not change anymore, and the water absorption rate of the adhesive layer 790 at this time is the saturated water absorption.

In some embodiments, the water vapor permeability of the optically clear adhesive (i.e., the adhesive layer 790/barrier layer 791) can be between 10 g/(m$^2$*day) and 5000 g/(m$^2$*day). The water vapor permeability of the adhesive layer 790 can affect the rate that moisture in the environment passes through the adhesive layer 790. In one embodiment, the adhesive layer 790 is made by choosing the material with water vapor permeability between 37 g/(m²*day) and 1650 g/(m²*day), and the rate of moisture in the environment is reduced through the adhesive layer 790. This effectively avoids or slows down the invasion of water vapor in the environment and attack on the electrode, thereby reducing the possibility of electromigration of metal nanowires. In particular, if the water vapor permeability of the barrier layer 791 is greater than 1650 g/(m²*day), it may cause the water vapor in the environment to pass through the barrier layer 791 too quickly. The water vapor may easily enter the aforementioned moisture intrusion interface, causing the water vapor in the environment to invade and attack the electrode, which significantly increases the possibility of electromigration of metal nanowires. It should be understood that the above water vapor permeability is defined as the weight of water vapor that can pass through an optically clear adhesive per unit area per 24 hours.

In some embodiments, the thickness H3 of the adhesive layer 790 can be between 150 μm and 200 μm. The thickness H3 of the adhesive layer 790 can affect the path that the moisture in the environment travels when the moisture passes through the adhesive layer 790, and therefore by setting the thickness H3 of the adhesive layer 790 to be between 150 μm and 200 μm, the time for the moisture in the environment to pass through the adhesive layer 790 can be increased. In this way, the invasion of water vapor in the environment and attack on the electrode can be effectively slowed down, thereby reducing the possibility of electromigration of metal nanowires and avoiding the overall thickness of the touch display module 700 from being too large. In detail, if the thickness H3 of the adhesive layer 790 is less than 150 μm, the time for the water vapor in the environment to pass through the adhesive layer 790 may be too short, so the water vapor in the environment can easily invade and attack the electrode. If the thickness H3 of 790 is greater than 150 μm, the overall thickness of the touch display module 700 may be too large, which is not conducive to the manufacturing process and seriously affects the appearance. In addition, the size of the barrier layer 791 in the horizontal direction (illustrated in the direction of FIG. 17A) is related to the thickness H3 of the adhesive layer 790. For example, the size of the barrier layer 791 in the horizontal direction is 0.3 to 1.0 times the thickness H3. In one example, the width of the barrier layer 791 (i.e., the size in the horizontal direction) is about 10 to 200 μm. In other words, the water vapor/moisture in the atmosphere needs to pass through the barrier layer 191 before it touches the above-mentioned moisture intrusion interface, and the barrier layer provides at least a 10 to 200 μm path to delay the time before the electrode of the touch panel 1000 is attacked and causes invalidation.

In detail, for the selection of the material properties of the above-mentioned optically clear adhesive and the setting of the thickness H3 of the optically clear adhesive, please refer to Table 1, which specifically lists various embodiments of the optically clear adhesive of the present disclosure and reliability test results of the manufactured products (for example, the touch display module 700).

TABLE 1

| Material | Example 1 Rubber | Example 2 Rubber | Example 3 Rubber | Example 4 Acrylic | Example 5 Acrylic | Example 6 Acrylic |
| --- | --- | --- | --- | --- | --- | --- |
| Dielectric constant value | 2.56 | 2.24 | 2.30 | 2.85 | 4.30 | 2.90 |

TABLE 1-continued

| Material | Example 1 Rubber | Example 2 Rubber | Example 3 Rubber | Example 4 Acrylic | Example 5 Acrylic | Example 6 Acrylic |
| --- | --- | --- | --- | --- | --- | --- |
| Saturated water absorption (%) | 0.10 | 0.11 | 0.08 | 0.20 | 1.10 | 0.40 |
| Water vapor permeability g/(m²* day) | 42 | 84 | 37 | 1350 | 1650 | 482 |
| Thickness (μm) | 150 | 200 | 200 | 200 | 150 | 200 |
| Reliability test results (hr) | 504 | 300 | 504 | 300 | 168 | 216 |

Figure 18:
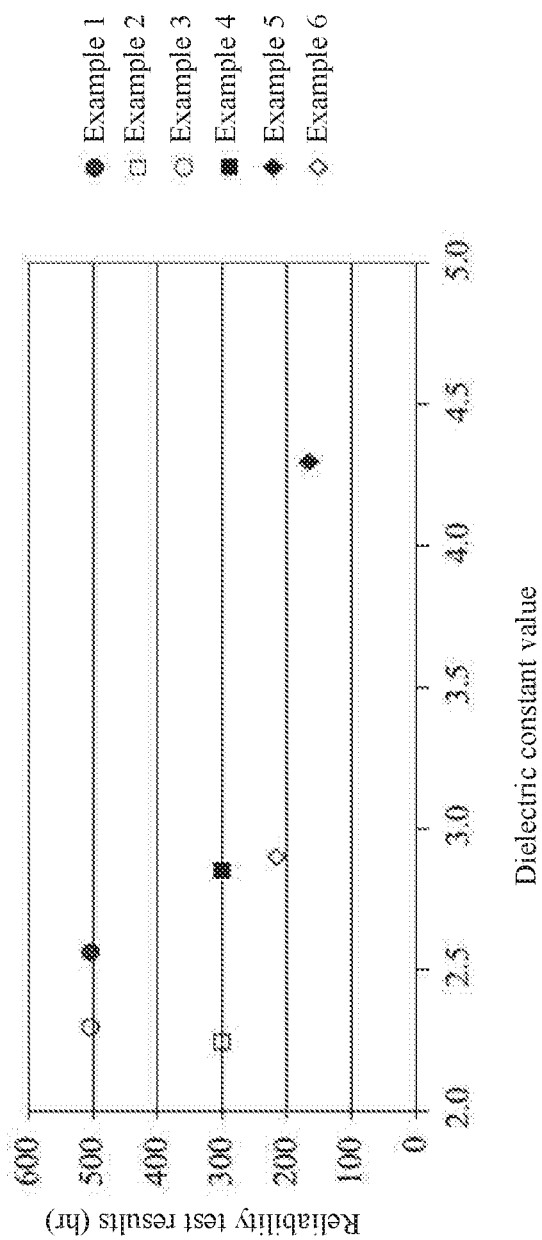
FIG. 18 is a graph of dielectric constant value—reliability test results drawn according to the examples in Table 1.

First of all, please refer to Table 1 and FIG. 18 at the same time. FIG. 18 is a graph of the dielectric constant value—reliability test results drawn according to various examples in Table 1. It can be seen from FIG. 18 that, in the case that the dielectric constant value of the adhesive layer 790/barrier layer 791 made of the optically clear adhesive is large, the reliability test results of the touch display module 700 made using the optically clear adhesive are better. Taking Example 3 as an example. The dielectric constant value of the adhesive layer 790/barrier layer 791 made of the optically clear adhesive is about 2.30, and the touch display module 700 made using the optically clear adhesive has been subjected to specific test conditions (for example, a temperature of 65° C., a relative humidity of 90%, a voltage of 11 volts). The touch display module 700 can pass the electrical test lasting about 504 hours and shows good reliability test results. Taking Examples 2 and 3 as examples. The adhesive layer 790/barrier layer 791 made of the optically clear adhesive has the same thickness (200 μm), dielectric constant between 2.24 to 2.30, and saturated water absorption about 0.1 wt. %. The touch display module 700 which is made of materials with water vapor permeability of less than 100 g/(m²*day) has been subjected to specific test conditions (for example, a temperature of 65° C., a relative humidity of 90%, and a voltage of 11 volts). The touch display module 700 can pass the electrical test lasting more than 300 hours and shows good reliability test results.

Figure 19:
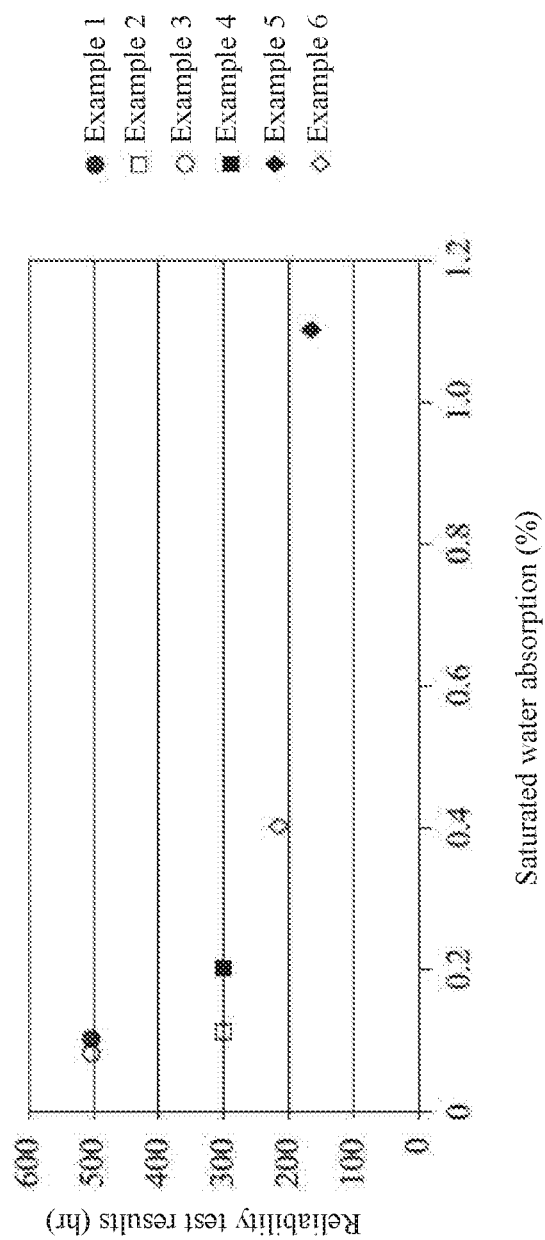
FIG. 19 is a graph of saturated water absorption—reliability test results drawn according to the examples in Table 1.

Next, please refer to Table 1 and FIG. 19 at the same time. FIG. 19 is a graph of saturated water absorption—reliability test results drawn according to the examples in Table 1. It can be seen from FIG. 19 that, in the case that the saturated water absorption of the adhesive layer 790/barrier layer 791 made of the optically clear adhesive is small, the reliability test results of the touch display module 700 made using the optically clear adhesive shows better. Taking Example 3 as an example. The saturated water absorption of the adhesive layer 790/barrier layer 791 made of optically clear adhesive is about 0.08%, and the touch display module 700 made by the optically clear adhesive has been subjected to specific test conditions (for example, a temperature of 65° C., a relative humidity of 90%, and a voltage of 11 volts). The touch display module 700 can pass the electrical test lasting about 504 hours and shows good reliability test results.

Figure 20:
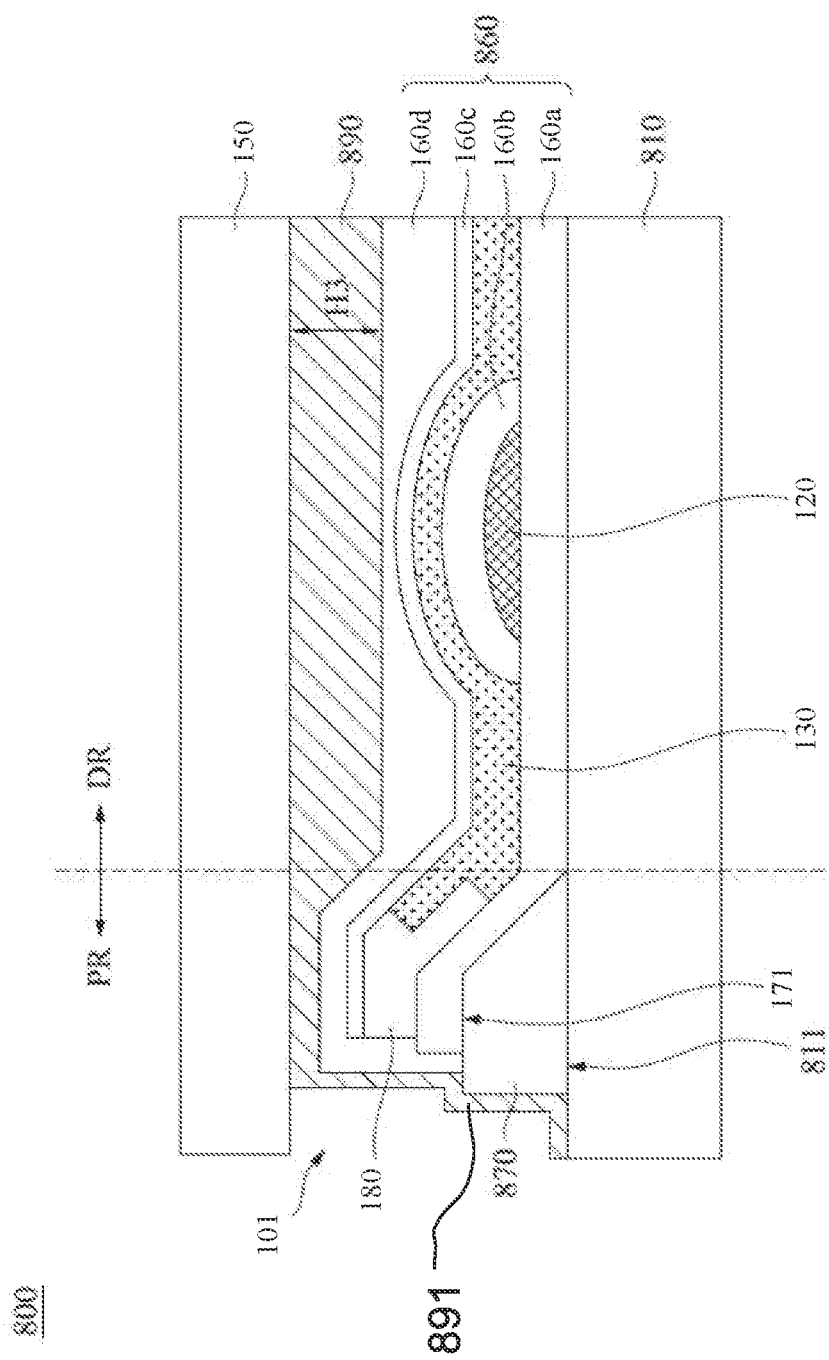
FIG. 20 is a schematic side view of a touch display module according to other embodiments of the present disclosure.

Please refer to FIG. 20, which is a schematic side view of a touch display module 800 according to an embodiment of the present disclosure. At least one difference between the touch display module 800 in FIG. 20 and the touch display module 700 in FIG. 17A is that the optically clear adhesive further extends along the sidewall of the light shielding layer 870 to the inner surface 811 of the substrate 810 to form a barrier layer 891 to cover the sidewall of the light shielding layer 870. In some embodiments, the barrier layer 891 can further extend laterally on the inner surface 811 of the substrate 810 and cover a part of the inner surface 811 of the substrate 810. In some embodiments, the optically clear adhesive can be conformally formed on the surface and sidewall of each layer (for example, the coating 860, and the light shielding layer 870). In this way, the optically clear adhesive can more completely protect the touch display module 800 from the side of the touch display module 800, thereby better preventing or slow down the intrusion of the moisture in the environment and attack on the electrode. In some embodiments, the touch display module 800 can pass the electrical test lasting about 504 hours under specific test conditions (for example, a temperature of 65° C., a relative humidity of 90%, and a voltage of 11 volts). This shows that the touch display module 800 of the present disclosure has good reliability test results.

It should be understood that the touch display modules 100 to 600 shown in FIGS. 1 to 6 can also use the adhesive layers 790 to 890 shown in FIG. 17A or FIG. 20. Therefore, the touch display modules 100 to 600 shown in FIGS. 1 to 6 are not only protected by the moisture barrier layers 140 to 640, but also protected by the optically clear adhesive with specific material properties, thereby achieving better water blocking effect.

On the other hand, the touch display module of the present disclosure can be, for example, a touch display module that has improved flexibility and can reduce cracks when bent. In other words, the substrate and adhesive layer of the touch display module of the present disclosure can have a certain degree of flexibility. The flexibility of the substrate can be achieved by adjusting the tensile modulus of the substrate, and the flexibility of the adhesive layer can be achieved by adjusting the storage modulus of the adhesive layer. In the following description, the touch display module 100 shown in FIG. 1 will be taken as an example for a more detailed description.

In some embodiments, the tensile modulus of the substrate 110 can be between 2000 MPa and 7500 MPa, and improved flexibility can also be obtained when the substrate 110 is used together with the adhesive layer 190. In detail, if the tensile modulus is less than 2000 MPa, the touch display module 100 may not be able to recover after bending. If the tensile modulus is greater than 7500 MPa, the adhesive layer 190 may not be able to fully reduce the excessive strength of the touch display module 100, thereby causing cracks of the touch display module 100 after bending. In some embodiments, the tensile modulus of the substrate 110 can be adjusted by controlling the resin type, thickness, curing degree, and molecular weight of the substrate 110.

The substrate 110 can include a material having a tensile modulus in the above range. For example, the substrate 110 can include polyester-based films of polyethylene terephthalate, polyethylene isophthalate, and polybutylene terephthalate; for example, cellulose-based films of diacetyl cellulose and triacetyl cellulose; polycarbonate-based films; for example, acrylic acid-cased films of poly(methyl) methacrylate and poly(ethyl) methacrylate; for example, styrene-based films of polystyrene and acrylonitrile-styrene copolymer; for example, polyolefin-based films of polyethylene, polypropylene, cycloolefin, cycloolefin copolymer, polynorbornene, and ethylene-propylene copolymer; polyvinyl chloride-based films; for example, polyamide-based films of nylon and aromatic polyamide; imine-based films; sulfone-based films; polyether ketone-based films; polyphenylene sulfide-based films; vinyl alcohol-based films; vinylidene chloride-based films; vinyl butyral-based films; allyl-based film; polyformaldehyde-based films; urethane-based films; epoxy-based films; and silicon-based film. In addition, the thickness of the substrate 110 can be appropriately adjusted within the above-mentioned tensile modulus range. For example, the thickness of the substrate 110 can be between 10 μm and about 200 μm.

In some embodiments, the storage modulus of the adhesive layer 190 at a temperature of about 25° C. can be less than 100 kPa. If the adhesive layer 190 is used together with the substrate 110 having the above tensile modulus range, the stress during bending can be reduced to reduce cracks. In a preferred embodiment, the storage modulus of the adhesive layer 190 at a temperature of about 25° C. can be between 10 kPa and 100 kPa. In addition, since the touch display module 100 can be used in various environments, its flexibility in a lower temperature environment also needs to be improved. In some embodiments, the storage modulus of the adhesive layer 190 at a temperature of about −20° C. can be less than or equal to 3 times of storage modulus at a temperature of about 25° C., so that the adhesive layer 190 can also have improved flexibility at low temperature. In some embodiments, the adhesive layer 190 can be, for example, a methacrylic transparent adhesive layer, an ethylene/vinyl acetate copolymer transparent adhesive layer, a silicon transparent adhesive layer (for example, a copolymer of silicon resin and silicon resin), a polyurethane transparent adhesive layer, a natural rubber transparent adhesive layer, or a styrene-isoprene-styrene block copolymer transparent adhesive layer. In some embodiments, it is possible to increase the proportion of monomers with a low glass transition temperature (for example, below −40° C.) among all monomers in the material of the adhesive layer 190, or to increase the proportion of the low-functionality resin (for example, below 3) among all resins in the material of the adhesive layer 190, to make the storage modulus of the adhesive layer 190 at a temperature of about 25° C. and about −20° C. within the above range.

It should be understood that the connection relationships, materials, and effects of the components that have been described will not be repeated. In the following description, the touch display module 100 shown in FIG. 1 will be taken as an example to further describe the manufacturing method of the touch display module 100.

First, a substrate 110 with the predefined display region DR and the predefined peripheral region PR is provided, and the light shielding layer 170 is formed in the peripheral region PR of the substrate 110 to shield the peripheral wires (for example, the peripheral wire 180) formed later. Subsequently, the bottom coating 160a is formed on the substrate 110, and the bottom coating 160a is further extended to the inner surface 171 of the light shielding layer 170 to cover a part of the light shielding layer 170. In one embodiment, the bottom coating 160a can be used to adjust the surface characteristics of the substrate 110 to facilitate the subsequent coating process of the metal nanowire layer (for example, the second conductive layer 130), and to improve the adhesion between the metal nanowire layer and the substrate 110. Next, a transparent conductive material (for example, indium tin oxide, indium zinc oxide, cadmium tin oxide, or aluminum-doped zinc oxide) is formed on the bottom coating 160a to obtain the first conductive layer 120 located in the display region DR after patterning, in which the first conductive layer 120 is used as a conductive electrode. Subsequently, the middle coating 160b is formed to cover the first conductive layer 120, so that the first conductive layer 120 and the second conductive layer 130 formed subsequently can be insulated from each other.

Next, a metal material is formed on the bottom coating 160*a*, and the peripheral wire 180 located in the peripheral region PR is obtained after patterning. In some embodiments, the metal material can be directly selectively formed in the peripheral region PR without being formed in the display region DR. In other embodiments, the metal material can be entirely formed in the peripheral region PR and the display region DR first, and then the metal material in the display region DR can be removed by steps such as photolithography. In some embodiments, the metal material can be deposited in the peripheral region PR of the substrate 110 by electroless plating. Electroless plating is used to reduce the metal ions in the plating solution to metal under the catalysis of a metal catalyst with the help of a suitable reducing agent under the condition of no external current, and plate the metal on the surface. This process can also be called autocatalytic plating. In some embodiments, the catalytic material can be firstly formed in the peripheral region PR of the substrate 110 without forming in the display region DR of the substrate 110. Since the display region DR does not include the catalytic material, the metal material is only deposited in the peripheral region PR without forming in the display region DR. During the electroless plating reaction, the metal material can nucleate on the catalytic material with catalytic/activation ability, and then continue to grow into a metal film by the self-catalysis of the metal material. The peripheral wire 180 of the present disclosure can include a metal material with better conductivity, preferably a single-layer metal structure, such as a silver layer, a copper layer, etc.; or the peripheral wire 180 can be a multilayer metal structure, such as a molybdenum/aluminum/molybdenum layer, titanium/aluminum/titanium layer, copper/nickel layer, or molybdenum/chromium layer, but is not limited to these. The above-mentioned metal structure is preferably opaque, for example, the light transmittance of visible light (such as a wavelength between 400 nm and 700 nm) is less than about 90%, but the size of the metal structure is small enough to be invisible to human eyes.

Subsequently, the second conductive layer 130 used as a conductive electrode is formed on the bottom coating 160*a*, the middle coating 160*b*, and the peripheral wire 180. Specifically, the first part of the second conductive layer 130 is located in the display region DR and attached to the surfaces of the bottom coating 160*a* and the middle coating 160*b*. The second part of the second conductive layer 130 is located in the peripheral region PR and attached to the surfaces of the bottom coating 160*a* and the peripheral wire 180. In some embodiments, the second conductive layer 130 can be formed by using a dispersion or slurry including metal nanowires through the steps of coating, curing, drying and molding, and photolithography. In some embodiments, the dispersion liquid can include a solvent, thereby uniformly dispersing the metal nanowires therein. Specifically, the solvent can be, for example, water, alcohol, ketone, ether, hydrocarbon, aromatic solvents (benzene, toluene, or xylene), or any combination of the above. In some embodiments, the dispersion can further include an additive, a surfactant, and/or a binder to improve the compatibility between the metal nanowires and the solvent and the stability of the metal nanowires in the solvent. Specifically, the additive, the surfactant, and/or the binder can be, for example, disulfonate, carboxymethyl cellulose, hydroxyethyl cellulose, hydroxypropyl methylcellulose, sulfonate, sulfate, phosphate, sulfosuccinate, a fluorine-containing surfactant, or any combination of the above.

In some embodiments, the coating step can include, but is not limited to, a process such as a screen printing, a nozzle coating, or a roller coating. In some embodiments, a roll-to-roll process can be used to uniformly coat the dispersion including metal nanowires onto the surfaces of the continued supply of the bottom coating 160*a*, the middle coating 160*b*, and the peripheral wire 180. In some embodiments, the curing and drying steps can volatilize the solvent and make the metal nanowires randomly distributed on the surfaces of the bottom coating 160*a*, the middle coating 160*b*, and the peripheral wire 180. In a preferred embodiment, the metal nanowires can be fixed on the surfaces of the bottom coating 160*a*, the middle coating 160*b*, and the peripheral wire 180 without falling off, and metal nanowires can contact each other to provide a continuous current path, thereby forming a conductive network.

In some embodiments, the metal nanowires can be further subjected to post-treatment to increase their conductivity. The post-treatment includes, but is not limited to, steps such as heating, plasma, corona discharge, ultraviolet light, ozone, or pressure. In some embodiments, one or more rollers can be used to apply pressure on the metal nanowires. In some embodiments, the pressure applied can be between 50 psi and 3400 psi. In some embodiments, the metal nanowires can be heated and pressurized simultaneously. In some embodiments, the temperature of the roller can be heated to between 70° C. and 200° C. In a preferred embodiment, the metal nanowires can be exposed to a reducing agent for post-treatment. For example, if metal nanowires are silver nanowires, they can be exposed to a silver reducing agent for post-processing. In some embodiments, the silver reducing agent can include a borohydride such as sodium borohydride, a boron nitride compound such as dimethylamine borane, or a gaseous reducing agent such as hydrogen. In some embodiments, the exposure time can be between 10 seconds and 30 minutes.

Then, at least one top coating 160*c* is formed to cover the second conductive layer 130. In some embodiments, the material of the top coating 160*c* can be formed on the surface of the second conductive layer 130 by coating. In some embodiments, the material of the top coating 160*c* can further penetrate between the metal nanowires of the second conductive layer 130 to form a filler and then be cured to form a composite structure layer with the metal nanowires. In some embodiments, heating and baking can be used to dry and cure the material of the top coating 160*c*. In some embodiments, the temperature of heating and baking can be between 60° C. and 150° C. It should be understood that the physical structure between the top coating 160*c* and the second conductive layer 130 does not limit the present disclosure. Specifically, the top coating 160*c* and the second conductive layer 130 can be a stack of two layers, or they can be mixed with each other to form a composite structure layer. In a preferred embodiment, the metal nanowires in the second conductive layer 130 are embedded in the top coating 160*c* to form a composite structure layer.

Subsequently, the structure (semi-product) including the substrate 110, the first conductive layer 120, the second conductive layer 130, and the coating 160 is placed in a vacuum coating equipment for vacuum coating, thereby forming the moisture barrier layer 140 on the surface and the sidewall 161*c* of the top coating 160*c*. Since the moisture barrier layer 140 is plated on the surface and the sidewall 161*c* of the top coating 160*c* in a vacuum environment, the bonding between the moisture barrier layer 140 and the surface and the sidewall 161*c* of the top coating 160*c* can be closer, thereby ensuring no any gap between the moisture barrier layer 140 and the top coating 160c to improve the product yield. In addition, the moisture barrier layer 140 formed in the vacuum environment can have a relatively compact structure, so as to better prevent moisture in the environment from intruding and attacking the electrode. Placing the structure including the substrate 110, the first conductive layer 120, the second conductive layer 130, and the coating 160 in vacuum coating equipment can also make the above layers more closely stacked, thereby reducing the impedance between layers. In detail, please refer to Table 2, which specifically lists the measured impedance values of the touch display module 100 of each example of the present disclosure before and after vacuum coating.

TABLE 2

|  | Example 1 | Example 2 | Example 3 | Example 4 | Example 5 | Example 6 | Example 7 |
|---|---|---|---|---|---|---|---|
| Impedance value before vacuum coating (Ω) | 28.32 | 28.31 | 35.11 | 36.96 | 25.68 | 31.06 | 26.31 |
| Impedance value after vacuum coating (Ω) | 22.83 | 27.03 | 31.01 | 22.09 | 21.26 | 28.07 | 25.05 |
| Rate of change of impedance value (%) | 19.39 | 4.52 | 11.68 | 18.06 | 17.21 | 9.63 | 4.79 |

It can be seen from Table 2, the impedance value of the touch display module 100 of each example of the present disclosure measured after the vacuum coating is significantly lower than the impedance value measured before the vacuum coating. Taking Example 1 as an example, the rate of change of the impedance value before and after the vacuum coating can be up to about 19.39%, which shows that the above vacuum coating method can indeed effectively reduce the resistance value of the touch display module 100.

Next, the adhesive layer 190 is formed on the moisture barrier layer 140, thereby fixing the display device 150 by the adhesive layer 190. In some embodiments, the material of the adhesive layer 190 can be formed on the surface of the moisture barrier layer 140 by coating. In other embodiments, the aforementioned vacuum coating method can also be used to form the adhesive layer 190 material on the surface of the moisture barrier layer 140, so that the bonding between the adhesive layer 190 and the moisture barrier layer 140 is closer to improve the yield of the product. After forming the adhesive layer 190 and fixing the display device 150, the touch display module 100 shown in FIG. 1 can be obtained.

The touch panel of the examples of the present disclosure can be assembled with other electronic devices, such as a display having touch function, and the substrate 110 can be attached to a display device, a liquid crystal display device, or an organic light-emitting diode (OLED) display device. An optical adhesive or other similar adhesives can be used for bonding between them. The touch sensing electrode TE can also be bonded with the outer cover layer (such as protective glass) by using an optical adhesive. The touch panel, antenna, and so on in the examples of the present disclosure can be applied to electronic devices, such as portable phones, tablet computers, notebook computers, and so on, and can also be applied to flexible products. The electrode of the examples of the present disclosure can also be fabricated on a polarizer. The electrode of the examples of the present disclosure can also be made on wearable devices (such as watches, glasses, smart clothes, smart shoes, etc.), automotive devices (such as dashboards, driving recorders, car rearview mirrors, car windows, etc.).

In summary, the present disclosure provides a touch display module with a moisture barrier layer and/or an adhesive layer of suitable material. The moisture barrier layer and/or the adhesive layer of suitable material can reduce the moisture intrusion from the environment, and the adhesive layer of suitable material can also reduce the speed of moisture transfer and the migration speed of metal ions produced by metal nanowires. In this way electromigration of metal nanowires can be avoided or the time of electromigration of metal nanowires can be slowed down, thereby meeting the requirements of improving product reliability test.

The above descriptions are only the preferred embodiments of the present disclosure and are not intended to limit the present disclosure. Any modification, equivalent replacement, improvement, etc., made within the spirit and principle of the present disclosure shall be included in the protection scope of the present disclosure.

What is claimed is:

1. A touch panel, comprising:
   a substrate;
   a bottom coating disposed on the substrate;
   an electrode disposed on the bottom coating;
   a first top coating disposed on the substrate and having at least a moisture intrusion interface, wherein the moisture intrusion interface wraps around and makes contact with a light shielding layer; and
   a barrier layer covering the moisture intrusion interface, wherein a saturated water absorption of the barrier layer is between 0.08 wt. % and 0.40 wt. %.

2. A touch panel, comprising:
   a substrate;
   a bottom coating disposed on the substrate;
   an electrode disposed on the bottom coating;
   a first top coating disposed on the substrate and having at least a moisture intrusion interface, wherein the moisture intrusion interface wraps around and makes contact with a light shielding layer; and
   a barrier layer covering the moisture intrusion interface, wherein a water vapor permeability of the barrier layer is between 10 g/(m$^2$*day) and 5000 g/(m$^2$*day).

3. A touch panel, comprising:
   a substrate;
   a bottom coating disposed on the substrate;
   an electrode disposed on the bottom coating;
   a first top coating disposed on the substrate and having at least a moisture intrusion interface, wherein the moisture intrusion interface wraps around and makes contact with a light shielding layer; and
   a barrier layer covering the moisture intrusion interface, wherein a dielectric constant of the barrier layer is between 2.24 and 2.30, a saturated water absorption is about 0.1 wt. %, and a water vapor permeability is below 100 g/(m$^2$*day).

4. The touch panel of claim 1, further comprising an adhesive layer and at least a second top coating disposed between the first top coating and the adhesive layer.

5. The touch panel of claim 4, wherein the moisture intrusion interface is covered by the second top coating.

6. The touch panel of claim 1, wherein the electrode is made of a composite structure having metal nanowires and the first top coating.

7. The touch panel of claim 1, further comprising at least an outermost peripheral wire, wherein the moisture intrusion interface is defined by at least one side of the outermost peripheral wire.

8. A device comprising the touch panel of claim 1.

9. The device of claim 8, wherein the device comprises an antenna structure, a coil, an electrode plate, a display, a portable phone, a tablet computer, a wearable device, a car device, a notebook computer, or a polarizer.

10. The touch panel of claim 4, wherein the barrier layer is formed by extending the adhesive layer.

11. The touch panel of claim 2, further comprising an adhesive layer and at least a second top coating disposed between the first top coating and the adhesive layer.

12. The touch panel of claim 11, wherein the moisture intrusion interface is covered by the second top coating.

13. The touch panel of claim 2, wherein the electrode is made of metal nanowires.

14. The touch panel of claim 11, wherein the barrier layer is formed by extending the adhesive layer.

15. The touch panel of claim 2, wherein the electrode is made of a composite structure having metal nanowires and the first top coating.

16. The touch panel of claim 3, further comprising an adhesive layer and at least a second top coating disposed between the first top coating and the adhesive layer.

17. The touch panel of claim 16, wherein the moisture intrusion interface is covered by the second top coating.

18. The touch panel of claim 3, wherein the electrode is made of metal nanowires.

19. The touch panel of claim 16, wherein the barrier layer is formed by extending the adhesive layer.

20. The touch panel of claim 3, wherein the electrode is made of a composite structure having metal nanowires and the first top coating.

* * * * *